United States Patent
McCoy et al.

(10) Patent No.: US 9,227,268 B1
(45) Date of Patent: Jan. 5, 2016

(54) METHODS, SYSTEMS, AND APPARATUSES FOR LASER SHOCK PEENING METAL MATERIALS

(75) Inventors: Nickolas K. McCoy, Lewis Center, OH (US); Jeff L. Dulaney, Delaware, OH (US); Steven M. Toller, Dublin, OH (US)

(73) Assignee: LSP Technologies, Inc., Dublin, OH (US)

( * ) Notice: Subject to any disclaimer, the term of this patent is extended or adjusted under 35 U.S.C. 154(b) by 2317 days.

(21) Appl. No.: 12/059,218

(22) Filed: Mar. 31, 2008

Related U.S. Application Data

(63) Continuation-in-part of application No. 11/689,128, filed on Apr. 13, 2007.

(51) Int. Cl.
*B23K 26/02* (2014.01)
*B23K 26/00* (2014.01)
*B23K 26/08* (2014.01)

(52) U.S. Cl.
CPC ......... *B23K 26/0069* (2013.01); *B23K 26/0884* (2013.01)

(58) Field of Classification Search
USPC ............... 219/121.6, 121.85, 121.83, 121 LF, 219/121 L, 121 LQ; 148/525, 565; 428/544, 428/610, 687, 217; 73/598, 599, 600, 643, 73/645, 11.02, 587; 702/36, 39, 40
See application file for complete search history.

(56) References Cited

U.S. PATENT DOCUMENTS

| | | | |
|---|---|---|---|
| 4,401,477 A | 8/1983 | Clauer et al. | |
| 5,025,552 A * | 6/1991 | Yamaoka | 29/825 |
| 5,239,408 A | 8/1993 | Hackel et al. | |
| 6,559,415 B1 | 5/2003 | Mannava et al. | |
| 6,629,464 B2 | 10/2003 | Suh et al. | |
| 6,657,160 B2 | 12/2003 | Hackel et al. | |
| 6,805,970 B2 | 10/2004 | Hackel et al. | |
| 2002/0008087 A1* | 1/2002 | Clauer et al. | 219/121.6 |
| 2003/0062350 A1* | 4/2003 | Staver et al. | 219/121.85 |
| 2006/0091121 A1* | 5/2006 | Zanolli et al. | 219/121.67 |
| 2007/0138157 A1 | 6/2007 | Dane et al. | |

* cited by examiner

*Primary Examiner* — Thien S Tran
(74) *Attorney, Agent, or Firm* — Benesch Friedlander Coplan & Aronoff LLP; Benjamen E. Kern

(57) ABSTRACT

Methods, systems, and apparatuses are disclosed for improving fatigue strength and damage tolerance of metal materials. For example, a system is provided for laser shock peening a metal material, the system comprising: a momentum trap material; a laser; an actuator, capable of pressing the momentum trap material into intimate contact with a first side of the metal material; and an advancer, capable of advancing the momentum trap material relative to the first side of the metal material.

26 Claims, 25 Drawing Sheets

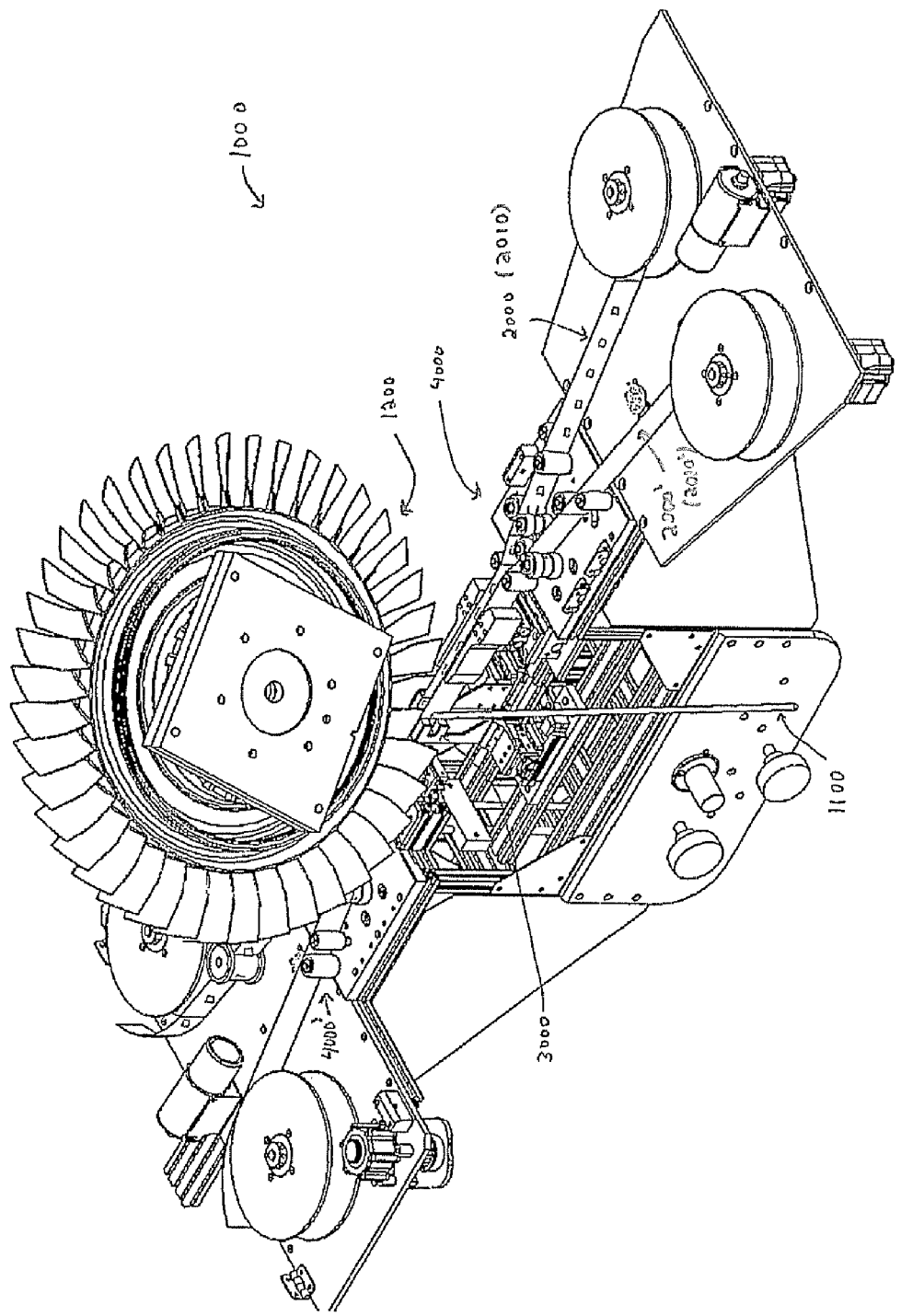

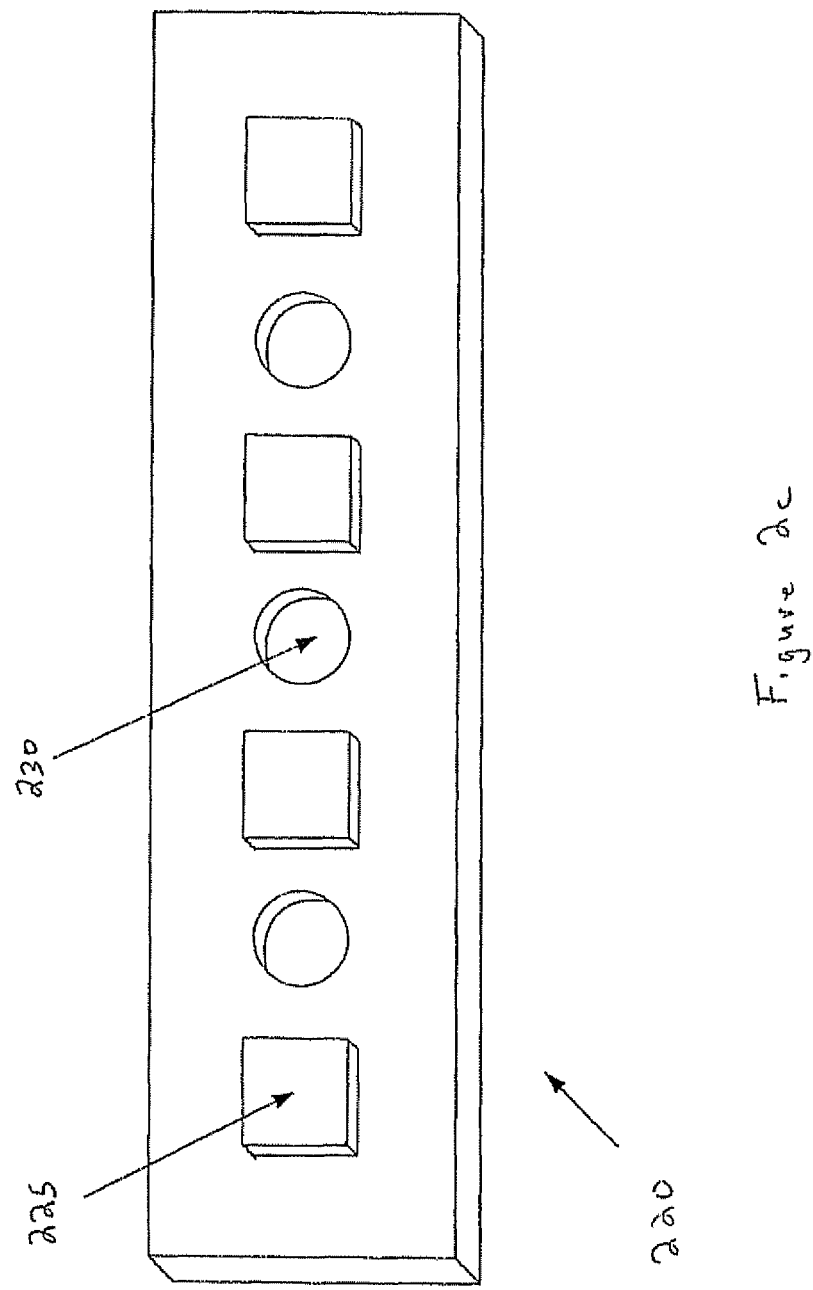

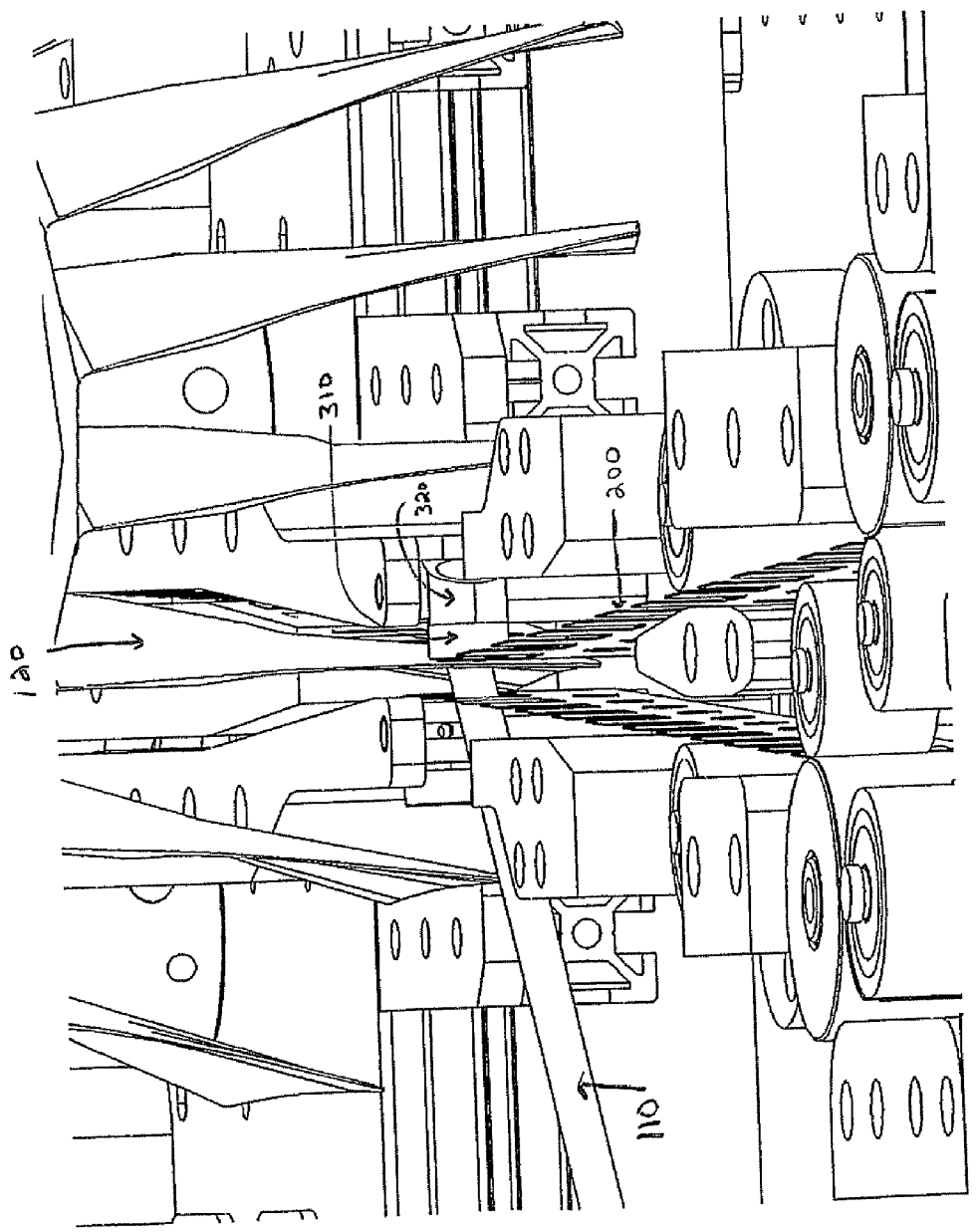

METHODS, SYSTEMS, AND APPARATUSES FOR LASER SHOCK PEENING METAL MATERIALS

CROSS REFERENCE TO RELATED APPLICATIONS

This application claims priority from and is a continuation-in-part of, pursuant to 35 U.S.C. §120, U.S. patent application Ser. No. 11/689,128, filed Apr. 13, 2007, which is incorporated herein by reference.

BACKGROUND

Laser shock peening (also known as the LaserPeen® process, laser shock processing, or laser peening) is an innovative surface treatment for improving the fatigue strength and damage tolerance of metal parts. Laser shock peening drives high amplitude shock waves into a material surface using high intensity laser pulses. The shock waves are used to develop deep compressive residual stresses in the surfaces of fatigue-prone parts. Typically, these stresses penetrate five to ten times deeper than conventional metal shot peening. These compressive surface stresses inhibit the initiation and propagation of fatigue cracks.

Before processing, an overlay coating, which may be substantially opaque to the laser beam, may be applied to the material surface being treated. An additional layer, which may be substantially transparent to the laser beam, may be placed over the opaque overlay. The opaque overlay may be, for example, black paint or tape. The transparent overlay may be, for example, flowing water.

The laser pulses pass through the transparent overlay and strike the opaque overlay, causing the opaque overlay to vaporize. The vapor absorbs the remaining laser energy and produces a rapidly expanding plasma plume. Since the expanding plasma is confined momentarily between the surface of the part and the transparent overlay, a rapidly rising high-pressure shock wave is created, which propagates into the part. When the peak stress created by the shock wave is above the dynamic yield strength of the metal, the metal yields, and the metal is "cold worked" or plastically deformed on, and just under, the surface. This plastic deformation results in compressive residual stresses in the surface of the part. The depth and magnitude of the residual stresses depend upon the magnitude and rate of attenuation of the shock wave as it passes through the surface layer, and upon the material properties and the processing conditions specific to the application. Compressive residual stresses typically extend as deep as about 0.040 to about 0.060 inches (about 1.0 to about 1.5 mm) into the surface and can approach the yield strength of the material.

Laser shock peening has been particularly effective at preventing fatigue failures in aircraft engine metal alloy fan and compressor blades. However, the potential application of this process is much broader. The application can encompass aerospace structures, helicopter gears and propulsion components, automotive parts, orthopedic implants, tooling and dies, and numerous other military and industrial components prone to metal fatigue failures.

In some circumstances, particularly those involving metal materials having very thin sections and alloys having low ductility, the high intensity stress waves created during laser shock peening have the potential to cause microstructural damage to the parts being processed. In thin section materials, the compressive stress wave reflects back from the opposite free surface of the part as a relatively high tensile stress wave. In cases where the magnitude of the reflected tensile stress wave exceeds the tensile strength of the material, micro-scale defects can occur. Such damage may include small "microcracks" (typically less than about 0.020 inches in length) or small grain boundary separations between microstructural phases, which tend to be the weakest regions in the material.

The present embodiments disclose methods, systems, and apparatuses for laser shock peening metal materials, including thin metal materials, while preventing or reducing the occurrence of laser shock peening-induced micro-scale defects.

SUMMARY

In one embodiment, a system is provided for laser shock peening a metal material, the system comprising: a momentum trap material; a laser; an actuator, capable of pressing the momentum trap material into intimate contact with a first side of the metal material; and an advancer, capable of advancing the momentum trap material relative to the first side of the metal material.

In another embodiment, a system is provided, the system comprising: a laser shock peening device capable of generating a laser pulse; and a first and a second conformable momentum trap material, capable of being pressed into intimate contact with a first side and a second side, respectively, of a workpiece, and configured such that each of the first and second conformable momentum trap materials is indexable.

In another embodiment, a system is provided for laser shock peening a workpiece, the system comprising: a laser; a tape having a plurality of metallic disks disposed thereon, the metallic disks having a sufficient acoustic impedance; an actuator, capable of pressing at least one of the metallic disks into intimate contact with a first side of the workpiece; and an advancer, capable of at least one of advancing the tape relative to the first side of the workpiece and advancing the first side of the workpiece relative to the tape.

In still another embodiment, a method is provided for laser shock peening a workpiece having a first side and a second side, the method comprising: intimately contacting at least a first portion of the first side of the workpiece with a first momentum trap material capable of being conformed to a shape of the first portion of the first side of the workpiece, and capable of being indexed to a second portion of the first side of the workpiece; laser shock peening at least a portion of the second side of the workpiece that is opposed to the first portion of the first side of the workpiece intimately contacting the first momentum trap material; releasing the first momentum trap material from the first side of the workpiece; intimately contacting at least a first portion of the second side of the workpiece with a second momentum trap material capable of being conformed to a shape of the first portion of the second side of the workpiece, and capable of being indexed to a second portion of the second side of the workpiece; and laser shock peening at least a portion of the first side of the workpiece that is opposed to the first portion of the second side of the workpiece intimately contacting the second momentum trap material.

In yet another embodiment, an apparatus is provided for laser shock peening a metal material, the apparatus comprising: a first actuator, capable of pressing a first momentum trap material into intimate contact with a first side of the metal material, while allowing access to a laser pulse directed to at least one of the first side of the metal material and a second side of the metal material; a second actuator, capable of pressing a second momentum trap material into intimate contact with the second side of the metal material, while allowing access to a laser pulse directed to at least one of the second side of the metal material and the first side of the metal material; at least one advancer, capable of advancing at least one of the first momentum trap material and the second momentum trap material relative to the first side of the metal material and the second side of the metal material, respectively.

It should be appreciated that the metal material or workpiece may be curved, contoured, or otherwise non-planar, or it may be flat.

BRIEF DESCRIPTION OF THE DRAWINGS

The accompanying figures, which are incorporated in and constitute a part of the specification, illustrate various example systems, methods, and results, and are used merely to illustrate various example embodiments.

FIG. 2e illustrates an exemplary embodiment of a momentum trap material in the configuration of a metal tape having spaced access holes.

FIG. 3b illustrates an exemplary operational view of the momentum trap system 100, wherein one of the momentum traps is engaged with respect to the workpiece.

DETAILED DESCRIPTION

Figure 1:
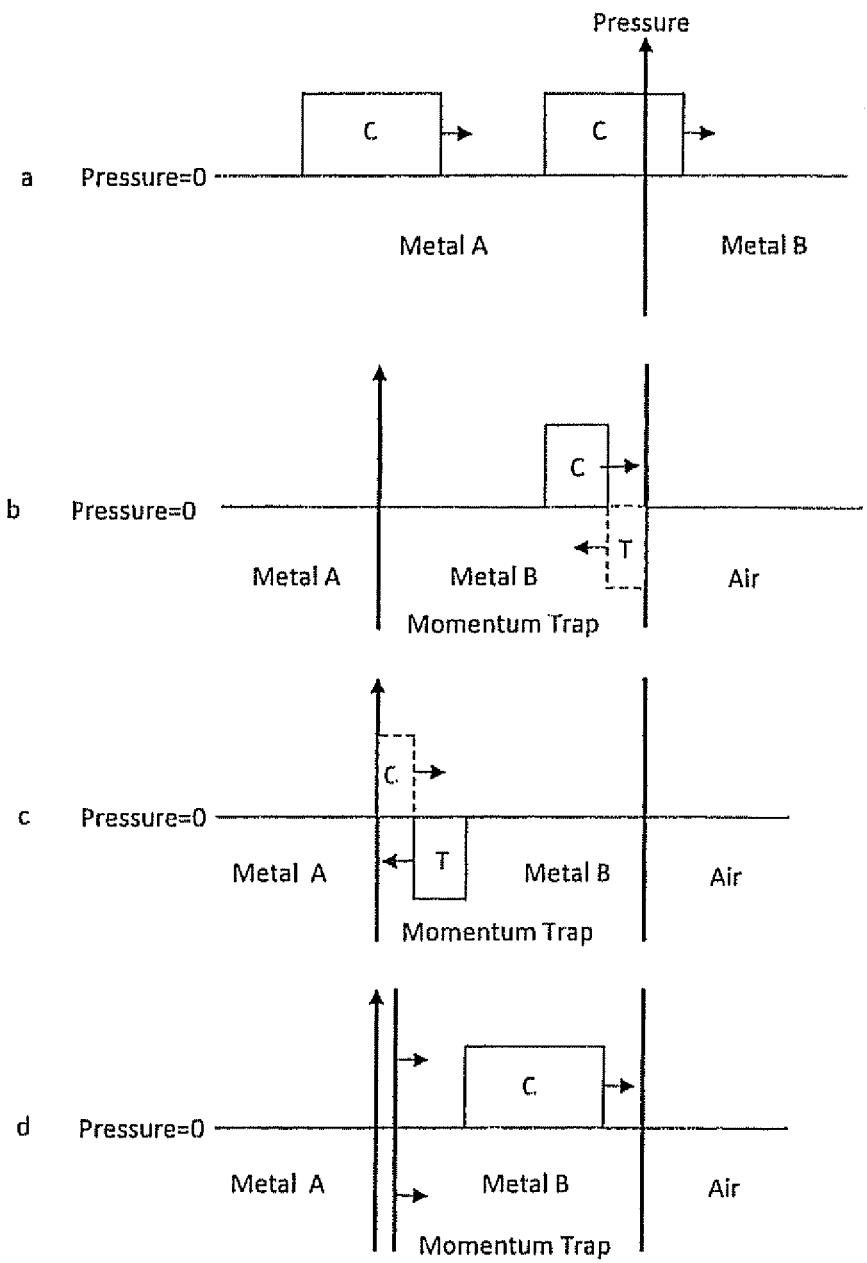
FIG. 1 illustrates a typical theoretical operation of a momentum trap placed against a surface of a workpiece.

One way to prevent or reduce the occurrence of laser shock peening-induced micro-scale defects is to provide a momentum trap on the opposite free surface of the part being laser shock peened. FIG. 1 shows a typical theoretical operation of a momentum trap ("Metal B") placed against the surface of a workpiece ("Metal A"). In the illustration, Metal B has the same acoustic impedance as Metal A. In "a", a compression shock wave ("C") is shown passing through the surface of Metal A into Metal B with no reflection. In practice, the acoustic impedances would typically be somewhat different and a small tensile or compressive reflection would occur at this surface. In "b", the compression wave is reflected as a tensile wave ("T") from the back surface of the momentum trap, an interface between Metal B and air. In "c", the reflected tensile wave in the momentum trap is reflected from the front surface of the momentum trap as a compression wave. The reflected tensile wave does not pass into Metal A, because the material in the tensile wave is moving to the right, and the unbonded interface cannot support a tensile stress. As a result, when the tensile wave meets the interface with Metal A, Metal B begins to pull away from Metal A. In practice, because of the difference in acoustic impedances, a small compression wave may propagate into Metal A (not shown). In "d", the movement of the momentum trap away from Metal A is shown.

Figure 1A:
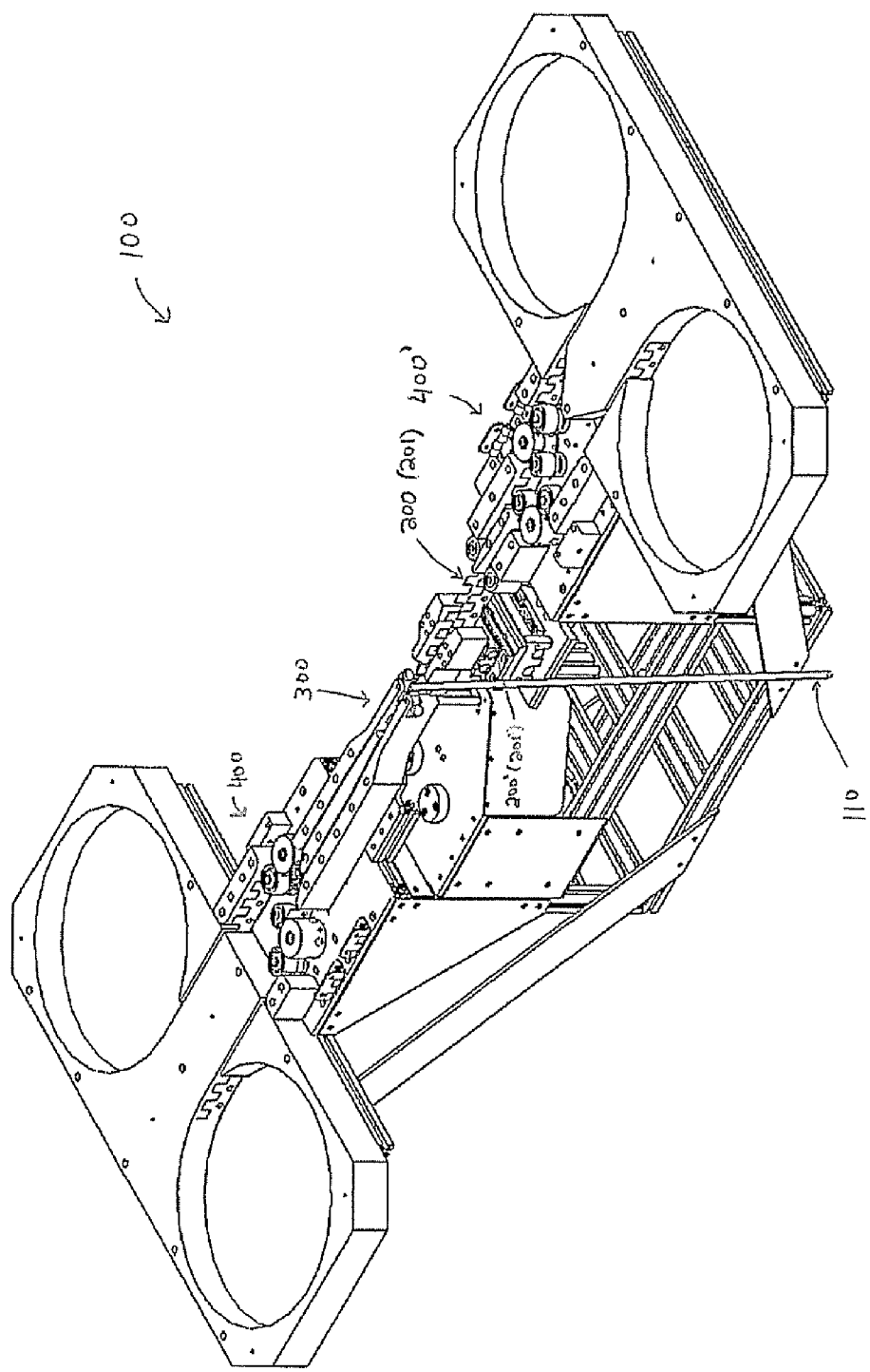
FIG. 1a illustrates an exemplary embodiment of a system 100 suitable for laser shock peening a metal material.
Figure 1B:
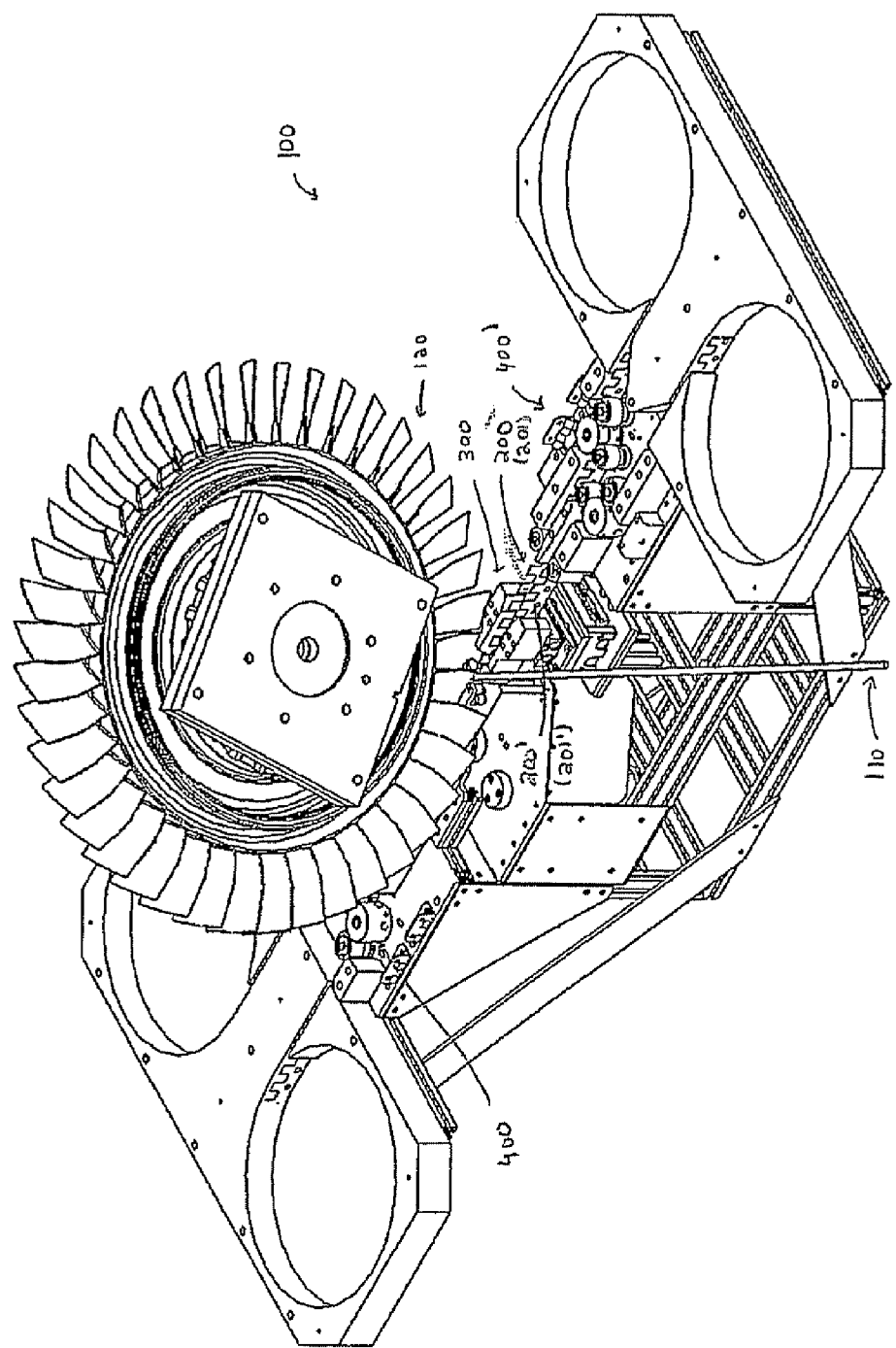
FIG. 1b illustrates an exemplary interface between system 100 and a gas turbine engine blade.
Figure 1C:
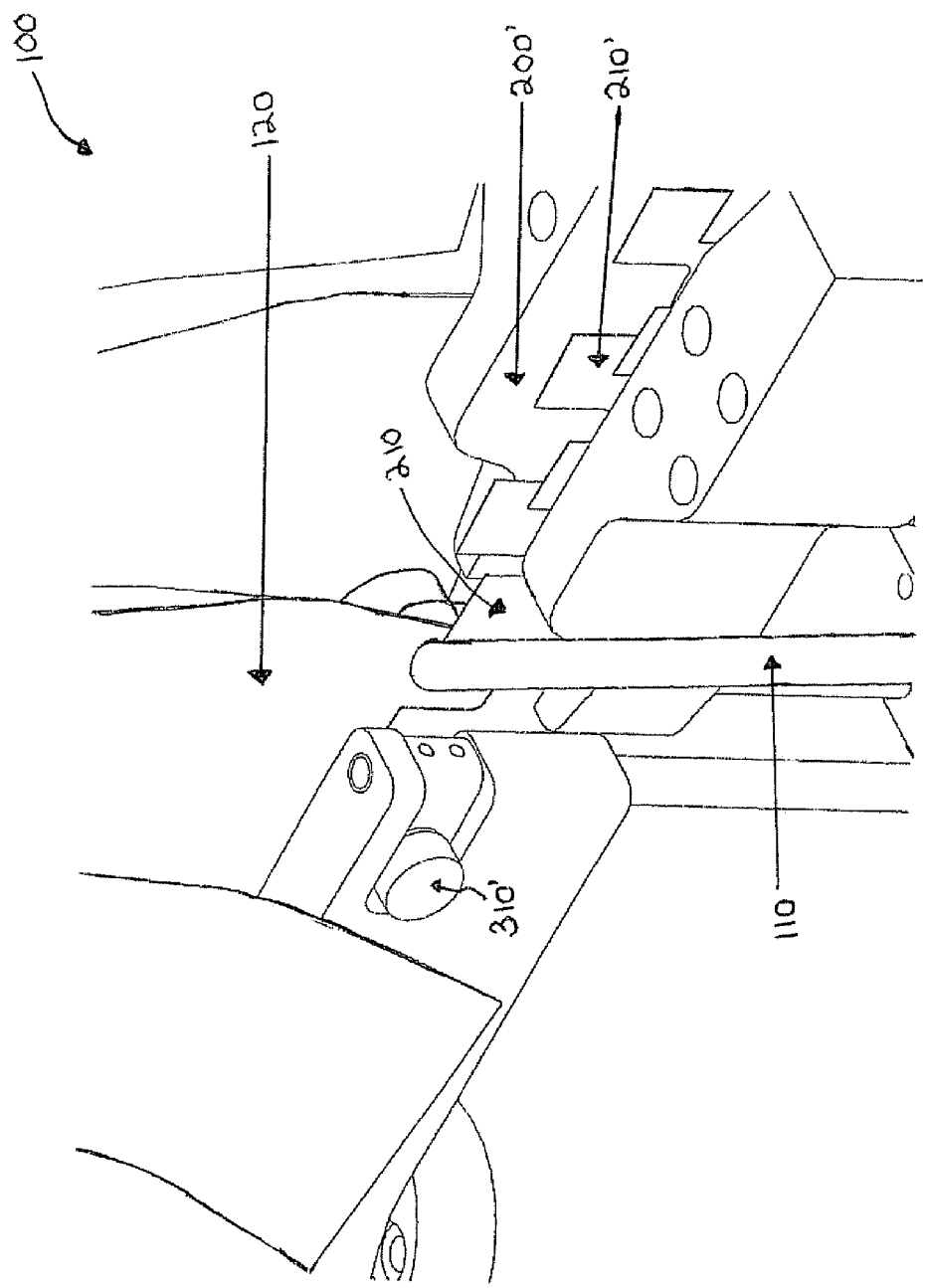
FIG. 1c illustrates an expanded view of an exemplary interface between system 100 and a gas turbine engine blade.
Figure 1G:
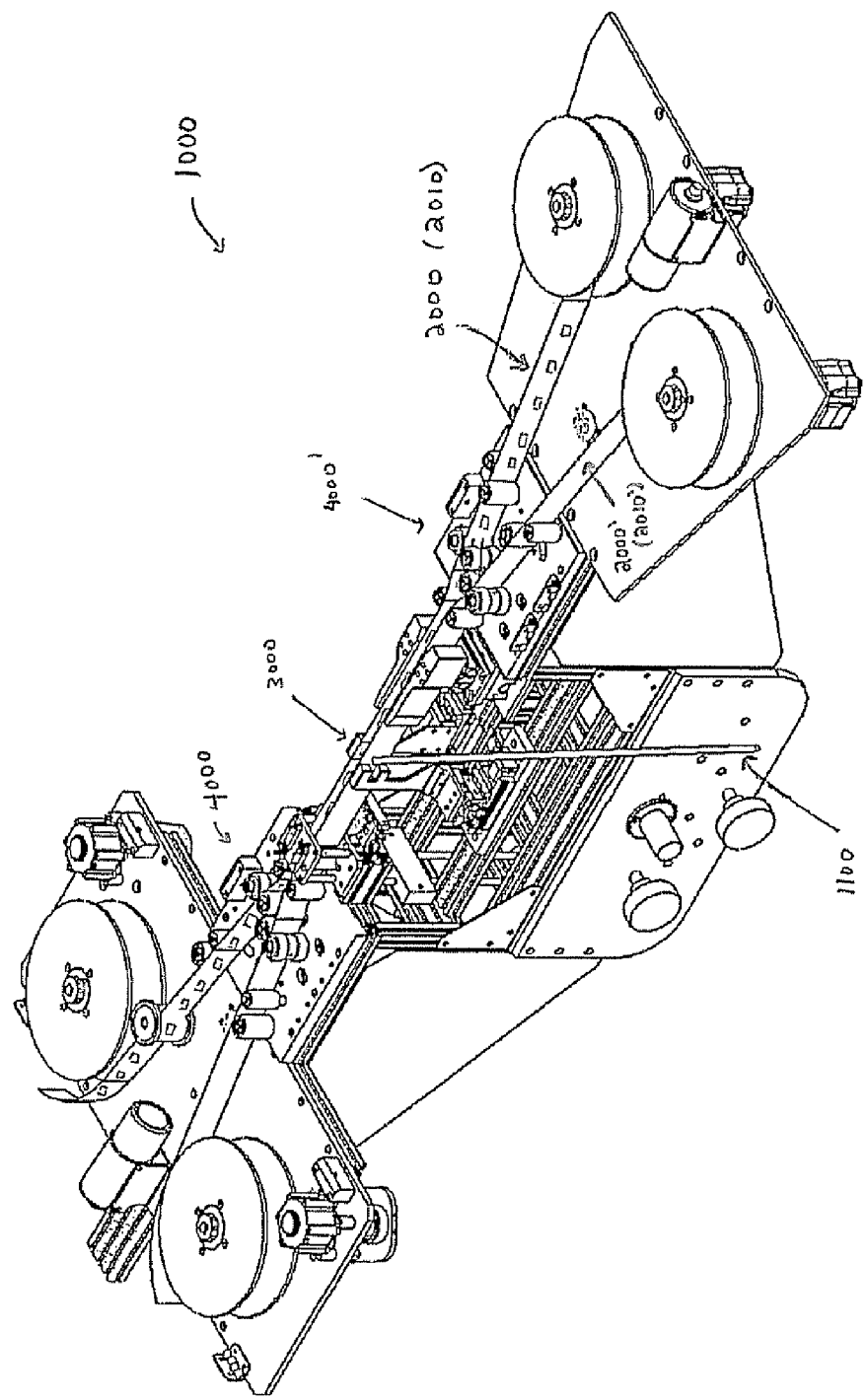
FIG. 1d illustrates an exemplary embodiment of a system 1000 suitable for laser shock peening a metal material.
FIG. 1e illustrates an exemplary interface between system 1000 and a gas turbine engine blade.
FIG. 1f illustrates an expanded view of an exemplary interface between system 1000 and a gas turbine engine blade.

An exemplary system is shown in FIG. 1a. With reference to FIG. 1a, a system 100 is provided, the system comprising: a momentum trap material 200; a laser, which imparts a laser pulse or beam 110; an actuator system 300, capable of pressing at least a portion of momentum trap material 200 into intimate contact with a first side of a metal material; and an advancer system 400, capable of advancing momentum trap material 200 along the first side of the metal material. A second momentum trap material 200' and a second advancer system 400' are also shown. FIG. 1b shows system 100 interfacing with metal material 120 (shown as a gas turbine engine blade). FIG. 1c shows an expanded view of system 100 interfacing with metal material 120.

To better appreciate the various alternative embodiments, similar or like components will be identified by similar or like numerals in the various figures, and newly described components will be identified by new numerals.

Figure 1F:
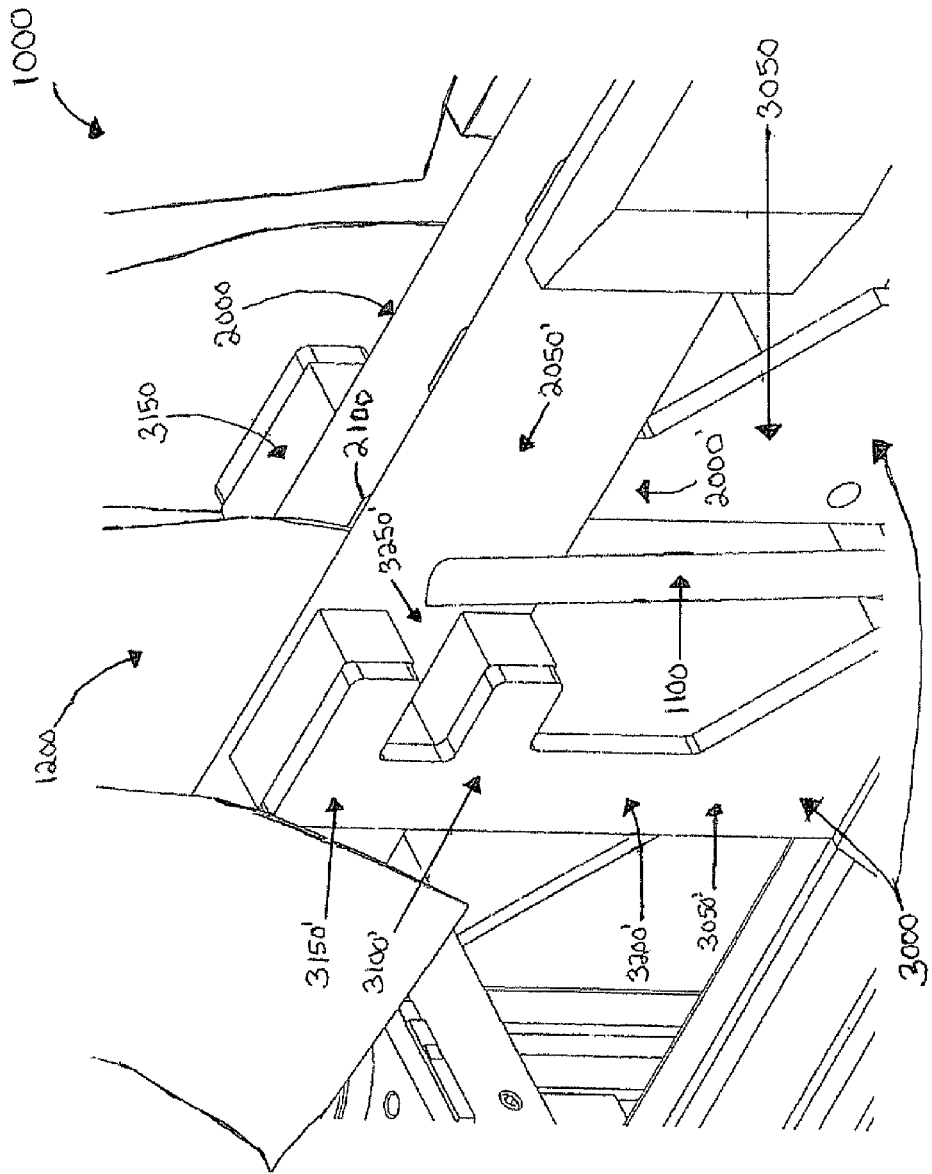

Another exemplary system is shown in FIG. 1d. With reference to FIG. 1d, a system 1000 is provided, the system comprising: a momentum trap material 2000; a laser, which imparts a laser pulse or beam 1100; an actuator system 3000, capable of pressing at least a portion of momentum trap material 2000 into intimate contact with a first side of a metal material; and an advancer system 4000, capable of advancing momentum trap material 2000 along the first side of the metal material. A second momentum trap material 2000' and a second advancer system 4000' are also shown. FIG. 1e shows system 1000 interfacing with metal material 1200 (shown as a gas turbine engine blade). FIG. 1f shows an expanded view of system 1000 interfacing with metal material 1200.

Metal Materials/Workpieces

The "metal material" or "workpiece" 120 or 1200 may be any metal or metal-containing material, regardless of actual thickness, that may suffer microstructural damage when subjected to laser shock peening as a result of compressive stress waves reflecting back as a tensile wave from the surface of the metal or metal-containing material opposite the surface being laser shock peened. Of course, conditions may exist wherein the reflected tensile wave may enhance the material properties of the metal or metal-containing material. For example, in a metal or metal-containing material having sufficiently high ductility, the reflected tensile wave may introduce plastic strain (cold work) without causing microcracking damage. The plastic strain may provide useful property benefits to the metal or metal-containing material such as, for example, increased hardness of the surface layer, enhanced fatigue resistance, and enhanced corrosion resistance. As such, the term "metal material" or "workpiece" may, in some embodiments, alternatively mean a metal or metal-containing material having sufficient ductility so as to benefit from some reflected tensile stress waves. The terms "metal material" and "workpiece" and "part" are used interchangeably herein.

An exemplary workpiece or metal material may be a gas turbine engine blade, as shown in FIGS. 1b-1c and 1e-1f. However, exemplary workpieces or metal materials may also include any aircraft engine metal alloy fan and compressor blades, aerospace structures, helicopter gears and propulsion components, automotive parts, orthopedic implants, tooling and dies, and numerous other military and industrial components prone to metal fatigue failures.

Momentum Trap Materials

Suitable momentum trap materials 200 or 2000 may include, for example, a tape. The tape may be a single continuous metal tape; a single continuous metal tape having at least one hole; multiple continuous metal tapes; multiple continuous metal tapes, at least one of which has at least one hole; a continuous polymer tape having at least one metal plate disposed thereon; a continuous polymer tape having at least one metal plate disposed thereon, and having at least one hole; a continuous polymer tape adhered to a metal tape; a continuous polymer tape adhered to a metal tape, at least one of the continuous polymer tape and the metal tape having at least one hole; a continuous polymer tape having discontinuous metal powder packets disposed thereon; a continuous polymer tape having discontinuous metal powder packets disposed thereon, the continuous polymer tape having at least one hole; and combinations thereof. It should be noted that when reference is made herein to a "first" momentum trap material or a "second" momentum trap material, the "first" and "second" momentum trap materials may be the same or different. The terms "tape" and "strip" are used interchangeably herein.

The momentum trap of momentum trap material 200 or 2000 typically has an acoustic impedance that is great enough to reduce the magnitude of a reflected tensile stress wave to a point where the reflected tensile stress wave will not cause undesirable damage in the workpiece (i.e., the momentum trap has "sufficient acoustic impedance"). For example, for a titanium alloy workpiece, a momentum trap made from stainless steel, e.g., Alloy 301 stainless steel, may be suitable.

Figure 2A:
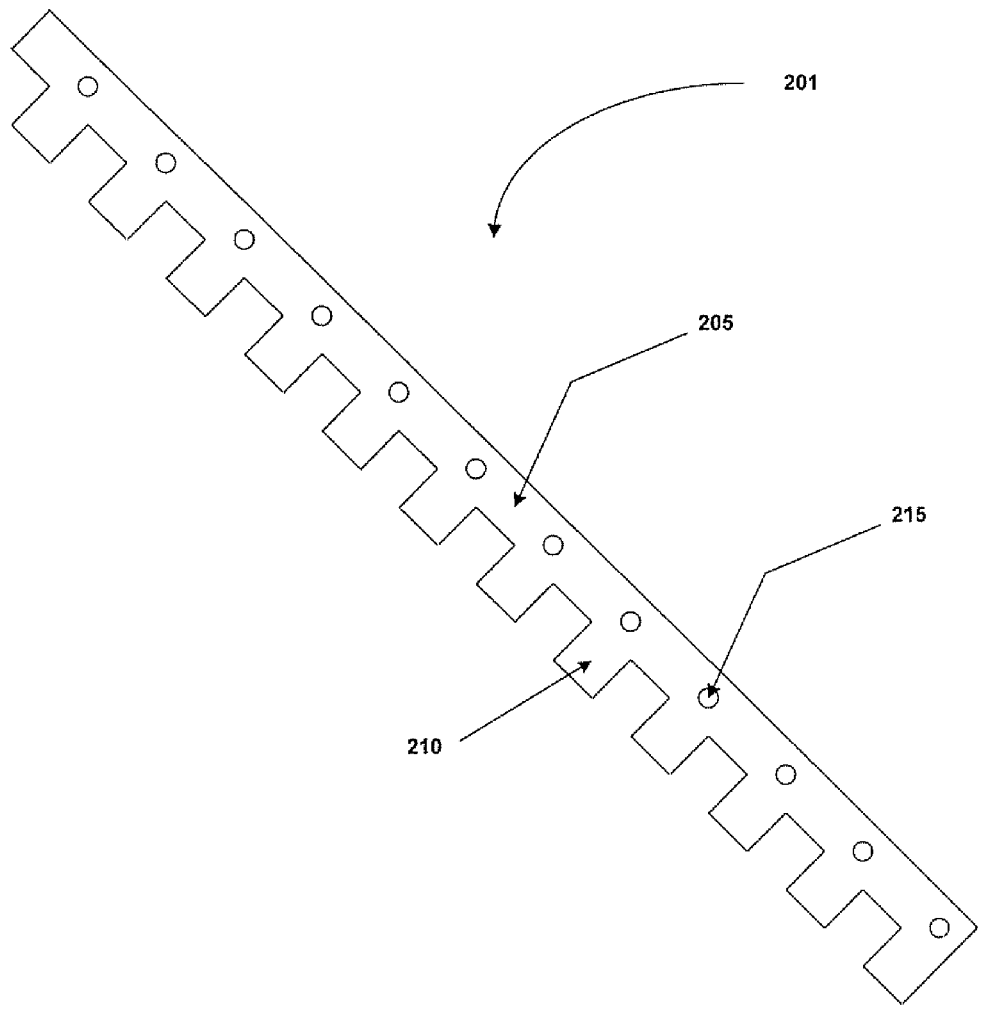
FIG. 2a illustrates an exemplary embodiment of a momentum trap material in the configuration of a metal tape having a plurality of metallic tabs extending from one edge of the metal tape, and having spaced holes.

In one embodiment, the momentum trap material may be a metal strip having a plurality of metallic tabs extending from at least one edge of the metal strip. The metal strip may have at least one hole. For example, with reference to FIG. 1a, the momentum trap material 200 may be embodied as metal strip 201. An expanded view of metal strip 201 is shown in FIG. 2a. As shown in FIG. 2a, metal strip 201 may have a body 205 and a plurality of metallic tabs 210 extending from an edge of body 205. In one embodiment, metallic tabs 210 serve as the momentum trap for individual laser pulses. Holes 215 may be used to index metal strip 201 to permit proper positioning for each laser pulse. It should be noted that when referring to momentum trap material 200' (or 201'), like elements will have like numerals, even if not specifically depicted in a figure.

With further reference to FIG. 2a, metal strip 201 may have a high level of elasticity or "springiness" to permit metal strip 201 to be pressed against a contoured workpiece, conforming to the workpiece's contour, and then springing back to a relatively flat strip after absorbing the laser generated shockwave. Metal strip 201 may be thick enough to permit the stress wave to be coupled into metal strip 201, yet thin enough and flexible enough to permit metal strip 201 to be pressed against and to achieve intimate contact with the workpiece surface. Effective thicknesses may generally fall in the range of about 0.001 inches to about 0.030 inches. An exemplary suitable metal strip 201 may be stainless steel, which may be, for example, 0.010" thick by 1,125" wide, having 0.500" wide metallic tabs 210 and 0.500" wide slots between metallic tabs 210, and having 0.260" drive holes 215. In one embodiment, an opaque processing tape overlay may be applied across at least one side of metal tabs 210.

Figure 2B:
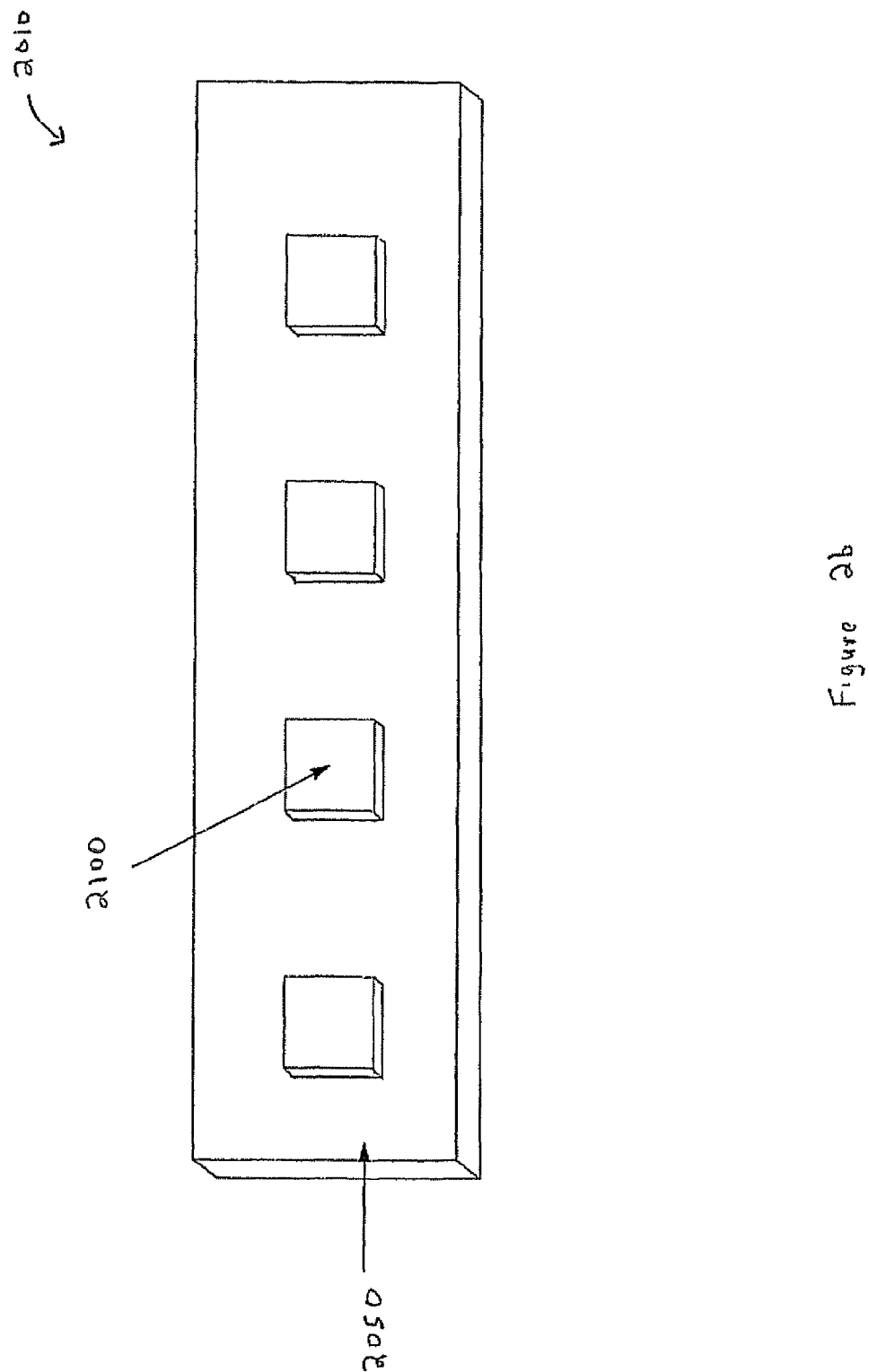
FIG. 2b illustrates an exemplary embodiment of a momentum trap material in the configuration of a polymer tape having a plurality of metallic plates or disks disposed thereon.

In an alternative embodiment, the momentum trap material may be a polymer tape having a plurality of metallic plates or disks disposed thereon. For example, with reference to FIG. 1d, the momentum trap material 2000 may be embodied as polymer tape 2010. An expanded view of polymer strip 2010 is shown in FIG. 2b. As shown in FIG. 2b, polymer strip 2010 may have a body 2050 and a plurality of metallic plates or disks 2100 disposed thereon. In one embodiment, metallic plates or disks 2100 serve as the momentum trap for individual laser pulses.

It should be noted that when a polymer tape is used, it may be useful to include a means for maintaining tension on the tape. Such means may include, for example, a dashpot, a damper, a dancer arm system using a resolver with motor feedback, a friction clutch, an electrical clutch, an encoder system with motor feedback, and a spring clutch. An alignment means may also be useful to ensure that the metal disks are in the correct location. Such alignment means may include, for example, one or more photoelectric sensors or proximity sensors, machine vision (cameras), and mechanical fixturing.

Other examples of suitable momentum trap materials exist. For example, in one embodiment, shown in FIG. 2c, a continuous polymer tape 220 may be a carrier for small sheet metal disks or plates 225 (as in polymer strip 2010). The metal plates 225 may be spaced along polymer tape 220 at regular intervals, as shown in FIG. 2c. In the embodiment shown in FIG. 2c, polymer tape 220 has holes 230 between metal plates 225 to allow direct access to the part surface. This embodiment may be useful, for example, in association with a paint coating device. The metal plates may be sandwiched between two polymeric tapes, or attached to the side of one tape.

Figure 2D:
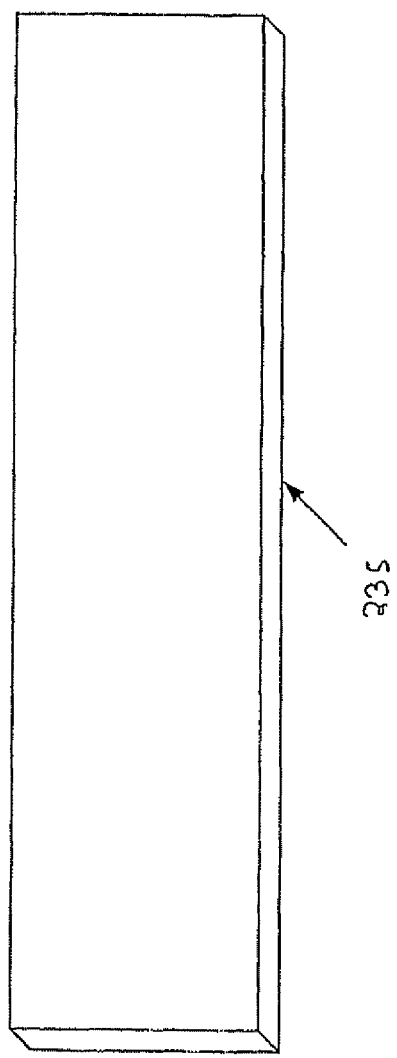
FIG. 2d illustrates an exemplary embodiment of a momentum trap material in the configuration of a metal tape.
Figure 2C:
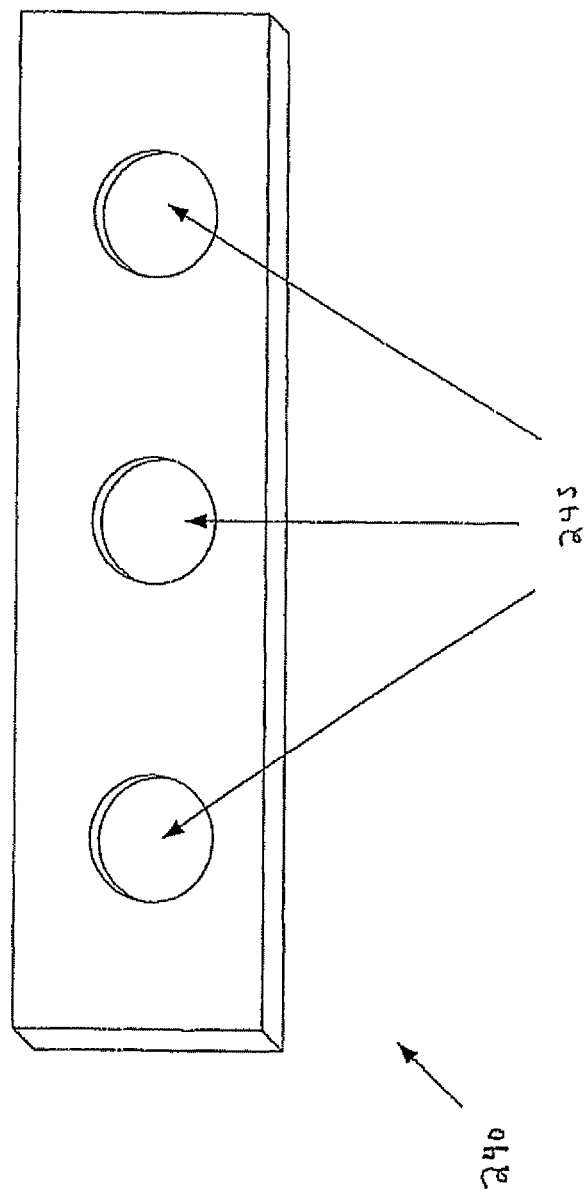
FIG. 2c illustrates an exemplary embodiment of a momentum trap material in the configuration of a polymeric tape containing alternating spaced metallic plates or disks and access holes.

In another embodiment, the momentum trap material may be a single continuous metal tape 235, as shown in FIG. 2d. This embodiment is useful where the thickness requirement of the tape is sufficiently low that the necessary flexibility is retained in the tape for the reel to reel feed system and conformable contact with the part surface. The thickness may be from about 0.002 inches to about 0.020 inches. This embodiment may significantly simplify the tape mechanical system. For this embodiment, the tape may be indexed forward for each shot. The size of the reels and amount of tape may enable the use of tape cartridges small enough (e.g., about 3 inches to about 10 inches in diameter) to be easily handled and enable a relatively compact tape apparatus.

In another embodiment, the momentum trap material may be a metal tape 240 having holes 245 punched therethrough at regular intervals, as shown in FIG. 2e. This embodiment is useful, for example, when the thin metal material is being laser shock peened from both sides. This allows metal tape 240 to be used as a momentum trap in the space between the holes 245, and then indexed forward, placing a hole 245 over the next spot to be laser shock peened on the tape side. This also allows direct access to the part surface through the holes 245, such as, for example, to an underlying tape or paint overlay when applying the laser pulse through a hole 245.

In one embodiment, the metal plates or disks of the previous embodiments may be replaced by a suitably thick powder layer. The powder layer thickness may be in the range of about 0.0002 inches to about 0.04 inches.

Figure 2F:
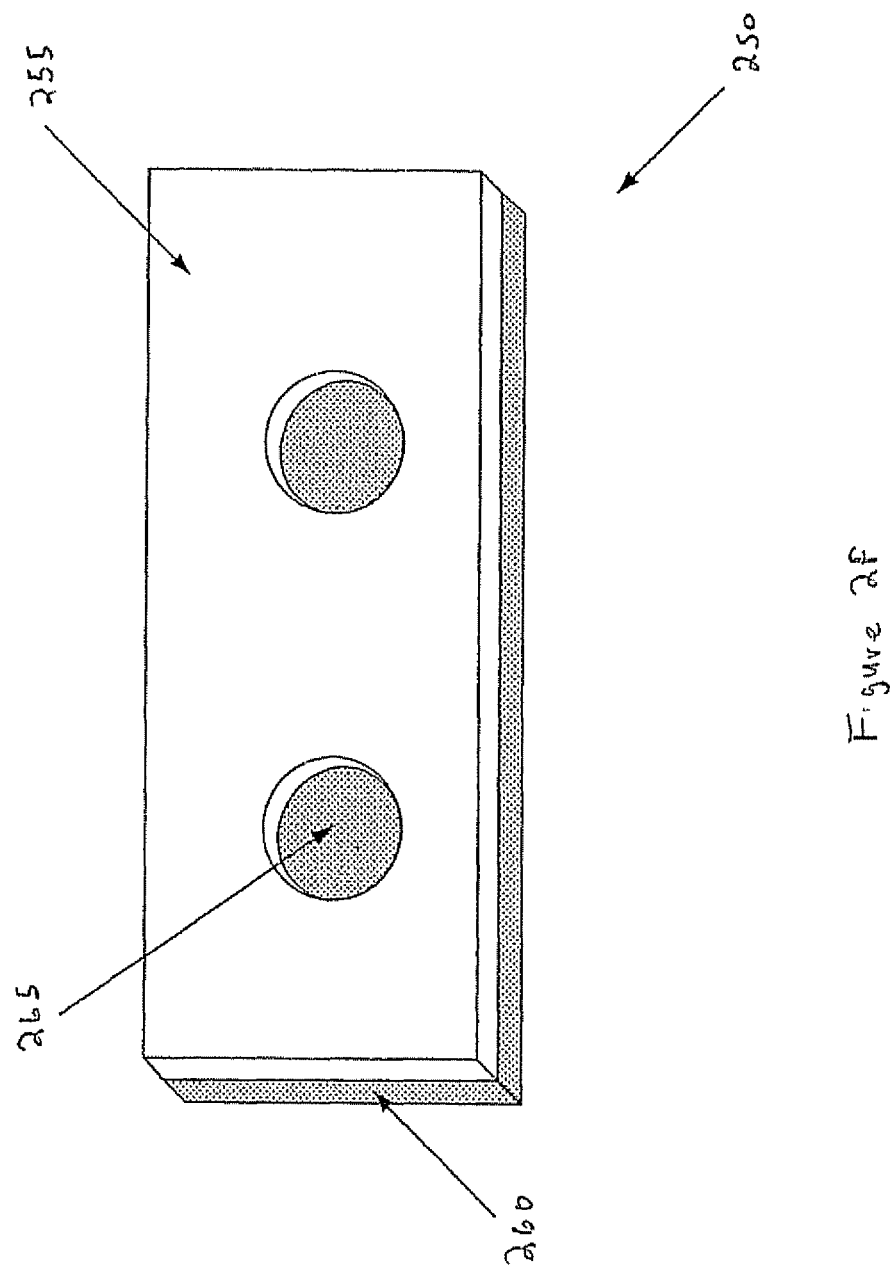
FIG. 2f illustrates an exemplary embodiment of a momentum trap material in the configuration of a metal tape bonded to a polymer tape, the metal tape having spaced access holes.

It should be noted that any of the metal tapes of the previous embodiments may be adhered to a polymer tape. This combination may be useful where it is advantageous not to have contact between the metal tape and the part surface because of concerns about, among other things, surface scratches or contamination of the part surface by direct contact with the metal tape. The polymeric tape may be between the metal tape and the part surface. For example, in one embodiment (shown in FIG. 2f), tape 250 includes metal tape 255 bonded to polymeric tape 260, and may have holes 265 punched through metal tape 255 at regular intervals. Polymeric tape 260 may then be accessed through holes 265 and perform as an opaque overlay material. Tape 250 then functions alternately as a momentum trap on the metal portion of the tape 255 between holes 265, and as an opaque overlay within holes 265.

Figure 2G:
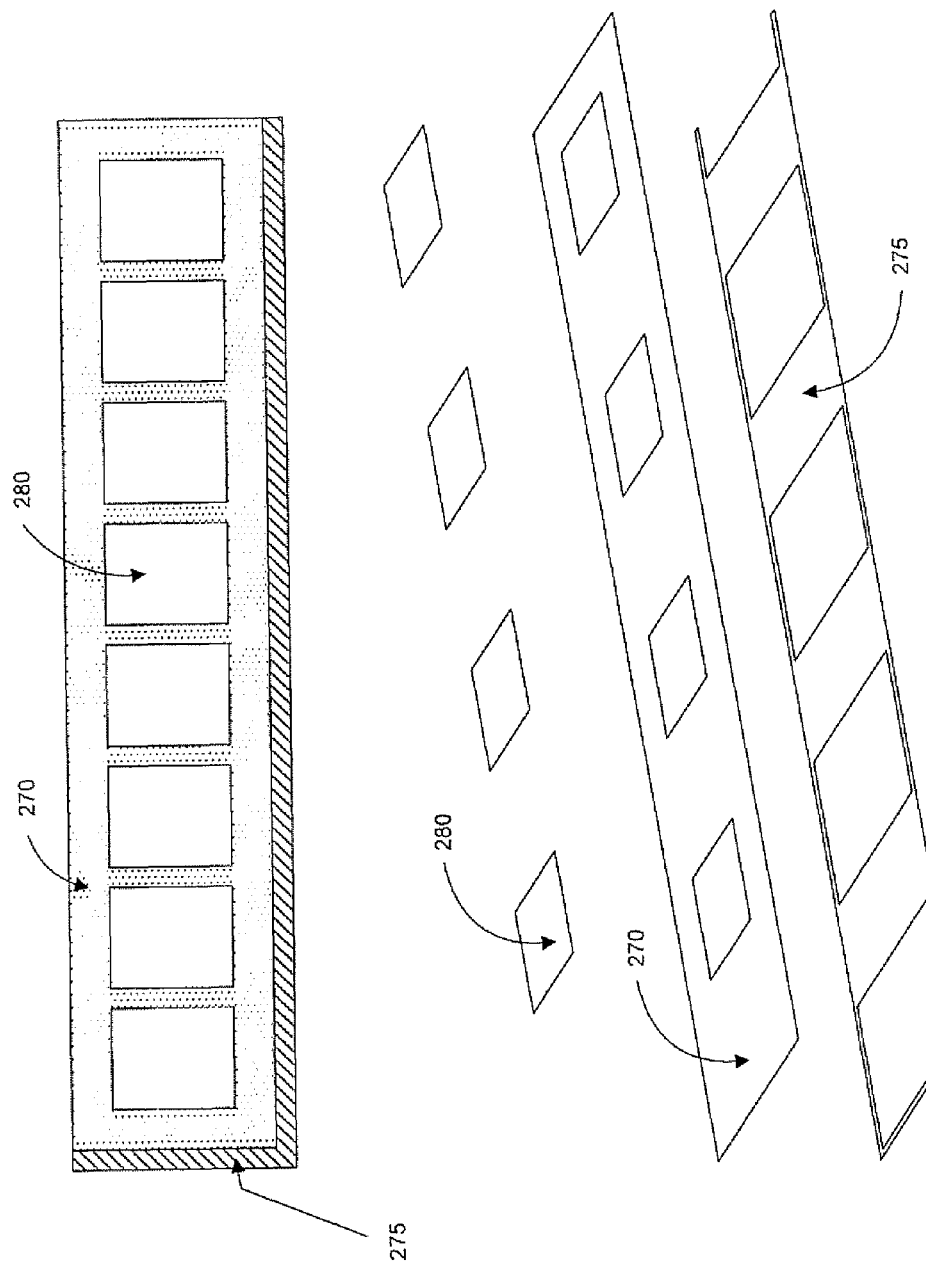
FIG. 2g illustrates an exemplary embodiment of a momentum trap material in the configuration of a polymer tape having a plurality of metallic plates or disks disposed thereon, and having a Mylar (polyethylene terephthalate) carrier base.

In another embodiment, shown in FIG. 2g, the tape may be a polymer tape 270 having a Mylar (polyethylene terephthalate) base carrier 275 which conjugates metal plates or disks 280 to the polymer tape 270. A blown-up view of the embodiment of FIG. 2g is also shown.

Figure 2H:
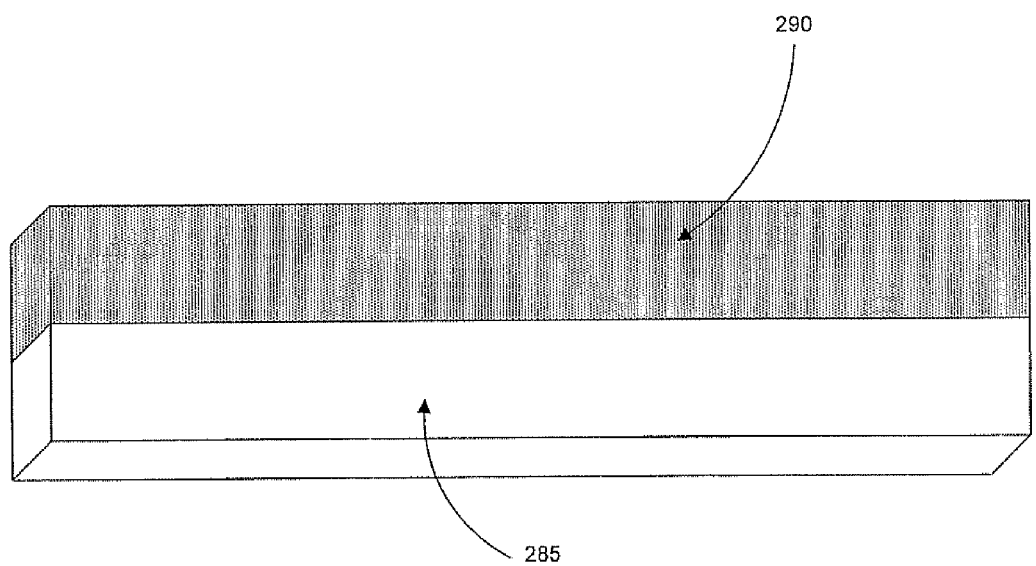
FIG. 2h illustrates an exemplary embodiment of a momentum trap material in the configuration of a tape, the tape being partially comprised of a polymer tape and partially comprised of a metal tape.

In still another embodiment, shown in FIG. 2h, the tape may be partially (e.g., one half) metal tape 285 and partially (e.g., one half) polymer tape 290.

Each of the above embodiments that include holes in the various tape layers have depicted the holes as being round or circular. It will be readily apparent, however, that the holes may alternatively be square, slotted, or may be any other shape within the ambit of the person of ordinary skill in the art. Likewise, where metal plates or disks or tabs are depicted as square in shape, it should be appreciated that any other shape (e.g., rectangular, circular, etc.) is possible within the ambit of the person of ordinary skill in the art. In addition, where a particular sequence of components is depicted (e.g., access hole, metal plate, access hole, etc.), it will be appreciated that any other sequence is equally contemplated.

In each of the exemplary embodiments described above, the momentum trap material is capable of being conformed to the negative shape of the portion of the metal material that is in intimate contact with the momentum trap material. As used herein, "intimately contacting" or placing two objects in "intimate contact" means the absence of a significant air gap (more than a few tens of micrometers) between the metal material or workpiece and the momentum trap material.

In one embodiment, the tapes may be stacked to improve conformability to the workpiece.

It is fully contemplated that other, non-air, materials of varying thicknesses may be placed between the momentum trap material and the workpiece. In one example, an opaque processing tape may be placed between the metal material and the momentum trap material. In another example, a whetting agent or "impedance coupling fluid" may be applied to at least one of the workpiece and the momentum trap material prior to laser shock peening. The fluid may facilitate achieving intimate contact between the momentum trap and the workpiece. The fluid, which is typically an oil, may increase the transfer of the shockwave because the fluid replaces the lower-impedance air with a higher (compared to air) impedance oil. The fluid may be applied by any means known in the art, including, for example, wipe, drip, or spray, prior to the surfaces of the momentum trap material and the workpiece coming into contact. The fluid may also inhibit scratching of the workpiece. Suitable impedance coupling fluids may include, for example, RapidCoater™ fluid (manufactured by LSP Technologies, Inc.), canola oil, vegetable oil, machining fluid, petroleum based oils, synthetic oils, and the like, and combinations thereof.

The applicability of the various embodiments described herein to both planar and non-planar contours will be readily apparent to one of ordinary skill in the art. In addition, each of the above embodiments may be automated, so as not to require manual placement and removal from the processed piece surface before and after each laser pulse, respectively. The momentum trap can be made regenerative or automatically replaceable. The momentum trap may be capable of repetitive use over a frequency range of 0.001 to 100 Hz. Finally, the exemplary methods, systems, and apparatuses described herein include the capability to use an "alternating side" methodology, i.e., laser shock peening a portion of the first side of the part to be processed at at least one location, and simultaneously or subsequently laser shock peening a portion of the second side of the part at at least one location, followed by laser shock peening a portion of the first side again, and so on (in other words, "sequentially repeating" the laser shock peening of the first and second sides of the thin metal material).

To perform effectively as a momentum trap material, the acoustic impedance of the momentum trap portion will have sufficient acoustic impedance. The term "sufficient acoustic impedance" means that a reflection of a shock wave through the processed part will not cause significant microcracking or other damage to the part. The acoustic impedance, Z (measured in units of $10^5$ g/cm$^2$ s), of a material is defined as the product of the density of the material multiplied by the sound or elastic wave velocity in the material.

The fraction of a traveling compressive wave that is reflected at the interface between the thin material and the momentum trap materials is given by:

$$P_R/P_I = (Z_1 - Z_2)/(Z_1 + Z_2)$$

$P_R$ is the reflected wave pressure (back into the thin metal material from the back surface of the thin metal material), $P_I$ is the incident wave pressure (onto the back surface of the thin metal material from within the thin metal material), $Z_1$ is the impedance of the thin metal material, and $Z_2$ is the impedance of the momentum trap material.

From this relationship, it may be seen that when the impedance of the second material (momentum trap material) equals that of the first material (thin metal material), there is no reflected wave, i.e., the entire compressive shock wave passes through the back surface into the second material.

When the impedance of the second material is less than that of the first material, a tensile wave is reflected back into the first material. The magnitude of this tensile wave varies from nearly zero, when the impedance of the second material is just below that of the first material, to 100 percent when the impedance of the second material is zero. The latter is the case when no momentum trap is used (the air behind a free surface has an impedance of essentially zero), and nearly 100 percent of the incident shock wave pressure is reflected back into the thin material as a tensile wave. The selection of a momentum trap material having an acoustic impedance less than the thin metal material will be determined in part by how much the magnitude of the reflected tensile wave must be reduced to avoid damage to the thin metal material. This selection will include consideration of the properties and thickness of the thin metal material, and the magnitude and duration of the initial shock wave entering the processed surface. For example, for $Z_2 \leq Z_1$, the ratio $Z_1:Z_2$ may be from about 1:1 to about 7:1, resulting in a reduction in the magnitude of the reflected tensile wave of from about 100% to about 25% of the incident shock wave.

When the impedance of the second material (momentum trap material) is greater than that of the first material (thin metal material), the shock wave reflected at the interface is compressive, and the magnitude of the transmitted compressive shock wave is increased by the same amount. When the impedance of the second material becomes very large compared to the first material, the magnitude of the compressive wave reflected back into the first material approaches that of the incident wave. The reflected compressive wave will not cause damage in the thin metal material, and may provide a benefit. If the magnitude of the reflected compressive wave at the back surface is above the dynamic yield strength, the response of the material at the back surface will be much like that at the front, processed surface being subjected to a laser-induced shock wave. The reflected compressive wave may produce plastic strain and a compressive residual stress at the back surface of the thin metal material. However, if the magnitude of the reflected compressive wave is sufficiently high, it may cause damage when reflected as a tensile wave from the opposite, processed surface in a thin metal material having low ductility. Where the thin metal material is sufficiently ductile, this reflected tensile wave at the processed surface may actually provide material benefits by introducing plastic strain, as described above. Under these circumstances, a momentum trap material may be chosen having $Z_2$ which is much greater than $Z_1$. The selection of a momentum trap material having an acoustic impedance greater than the thin metal material will depend in part on the potential for damage on the front side of the thin metal material from a tensile wave reflection and considerations for deriving some compressive residual stress benefit at the back surface of the thin metal material. This selection will include consideration of the properties and thickness of the thin metal material and the magnitude and duration of the initial shock wave entering the processed surface. For example, under these circumstances, for $Z_2 \geq Z_1$, the ratio $Z_2:Z_1$ may be from about 1:1 to about 1:0.05, resulting in an increase in the magnitude of the reflected compressive wave of from about 0% to about 90% of the incident shock wave.

Depending on the thickness and properties of the material being processed and the laser shock peening conditions, the thickness and property ranges of a suitable momentum trap material can be determined. This determination takes into consideration the pressure profile of the shock wave, the duration of the shock wave, and the material properties. Tradeoffs can be made on thickness of the momentum trap and relative shock impedances, depending on the constraints imposed on the application of the momentum trap.

Laser Systems

Typical laser shock peening apparatuses, devices, and systems include, for example, those disclosed in U.S. Pat. Nos. 5,131,957, 5,741,559, and 7,268,317, all of which are incorporated herein by reference in their entirety, and the like. Other types of exemplary lasers adaptable for use with the present embodiments include Nd-glass lasers manufactured by LSP Technologies, Inc. of Dublin, Ohio.

Actuator Systems

Figure 3A:
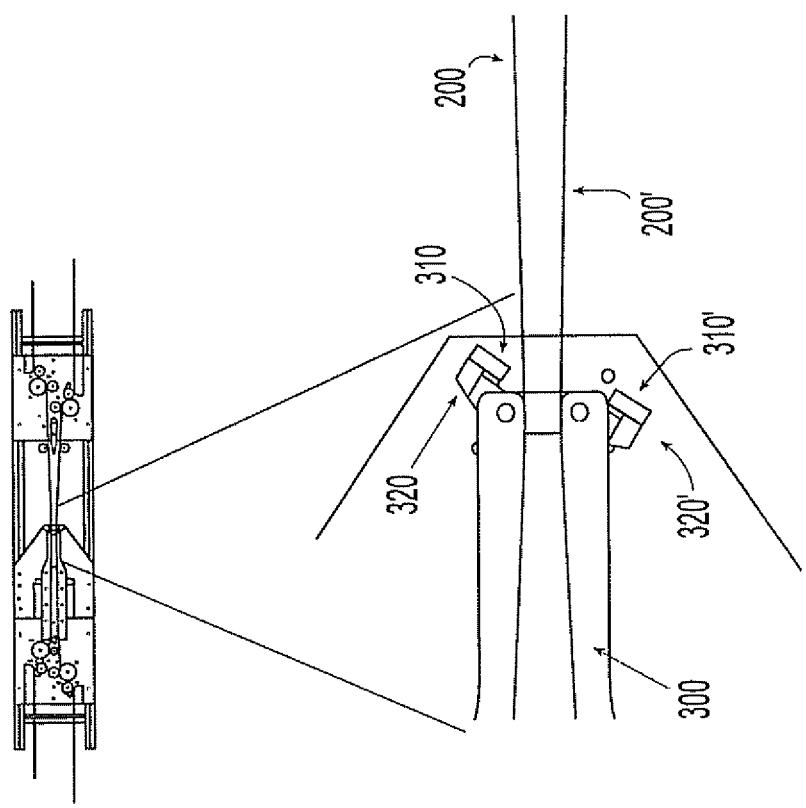
FIG. 3a illustrates an exemplary actuator system, shown in conjunction with a momentum trap material in the configuration of a metal tape having a plurality of metallic tabs extending from one edge of the metal tape, and having spaced holes.

With reference to FIG. 1b, actuator system 300 may be capable of pressing momentum trap material 200 into intimate contact with a first side of metal material 120. FIG. 3a illustrates an exemplary actuator system 300, shown in conjunction with a momentum trap material in the configuration of a metal tape having a plurality of metallic tabs extending from one edge of the metal tape, and having spaced holes. In the actuator system shown in FIG. 3a, the actuator is an elastomeric disk 310, which may be pressed against momentum trap strip 200 with a retractable metal arm 320.

For alternate side processing, the first momentum trap material 200 may be pressed against the surface of workpiece 120 by elastomeric disk 310, then released as strip 200 moves forward (to avoid marking workpiece 120 during movement). Then, the opposite strip 200' is pressed inward, and so forth. FIG. 3b illustrates an exemplary operational view of the momentum trap system 100, wherein one of the momentum traps is engaged with respect to the workpiece. More specifically, FIG. 3b shows a laser beam 110 striking a workpiece 120 wherein momentum trap 200 is engaged on the opposite side of the surface of the workpiece 120 to be processed (i.e., arm 320 is engaged so that actuator 310 is pressing momentum trap 200 into intimate contact with workpiece 120).

Various materials may be used as the actuator, but elastomeric or otherwise conformable materials, such as rubber, plastic, or a thin metallic sheet such as shim stock, are useful, as they may conform well with the momentum trap as the momentum trap is pressed against the workpiece surface. An actuator that has been pre-molded to the exact contours of the workpiece's surface may also be useful. FIG. 3a also illustrates exemplary relative positioning of actuator system 300 to other elements of an exemplary momentum trap system.

At thin edges of a workpiece (e.g., blade edges), positioning and conformity of the process tape and the momentum trap material 200 may be further enhanced by a secondary actuator system. Thus, in one embodiment, the system may comprise an additional actuator to draw the momentum trap 200 against the blade edge of workpiece 120. The additional actuator squeezes momentum strips 200 and 200' together and tensions the strips slightly off-axis, pulling the strips slightly around the blade edge, thereby providing superior conformity of the momentum trap material 200 to the blade edge of workpiece 120.

In another embodiment, this time with reference to FIG. 1f, actuator system 3000 may be capable of pressing momentum trap material 2000 into intimate contact with a first side of metal material 1200. In the actuator shown in FIG. 1f, the actuator system comprises two retractable arms (actuators) 3050 and 3050', each having an upper portion in the shape of an "F"—that is, each comprises two horizontal bars 3100 (obscured) (3100') and 3150 (3150') extending from a vertical bar 3200 (obscured) (3200'), thereby forming a space 3250 (obscured) (3250') between horizontal bars 3100 (3100') and 3150 (3150'). Of course, it will be readily apparent that many other shapes are suitable for such a retractable arm. For example, any shape that would allow the retractable arm (actuator) to press a momentum trap material into intimate contact with a workpiece, while simultaneously allowing a laser pulse to access the workpiece from the same side, would be suitable. For example, the shape may include "P", "U", and "V" shaped retractable arms, or complex curves suited to the individual workpiece geometry.

In one embodiment, retractable arm 3050 presses momentum trap material 2000 into intimate contact with a first side of workpiece 1200, such that momentum trap 2100 (partially obscured) is positioned in or near space 3250 (obscured). A laser pulse may then be applied to a second side of workpiece 1200 opposite the first side. For example, the laser pulse may be delivered through space 3250' onto workpiece 1200. As described above, an opaque layer may cover the portion of workpiece 1200 to which the laser pulse is applied. A transparent layer may cover the opaque layer. The momentum trap material 2000 and/or the workpiece 1200 may be indexed forward relative to each other, to prepare for a second shot.

For alternate side processing, retractable arm (actuator) 3050 presses momentum trap material 2000 into intimate contact with a first side of workpiece 1200, such that momentum trap 2100 (partially obscured) is positioned in or near space 3250. At the same time, retractable arm (actuator) 3050' presses momentum trap material 2000' into intimate contact with a second side of workpiece 1200 opposite the first side, such that the polymer tape portion (2050') of momentum trap material 2000' is positioned in space 3250'. A laser pulse may then be applied to the polymer tape portion 2050' of momentum trap material 2000' that is in intimate contact with the second side of workpiece 1200. The laser pulse may be delivered through space 3250' onto workpiece 1200. The process may be sequentially repeated for processing on the other side of workpiece 1200.

Figure 3C:
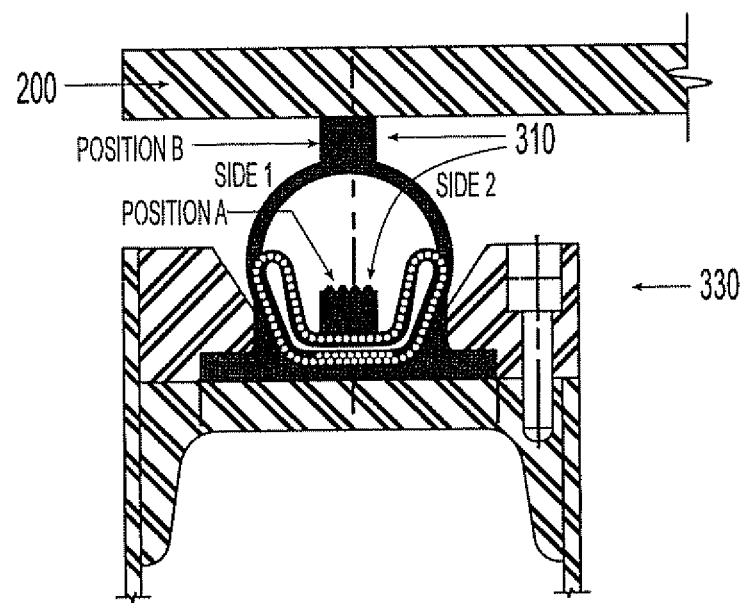
FIG. 3c illustrates an exemplary embodiment of an actuator that is engaged and disengaged via hydraulic or pneumatic pressure.

In an alternative embodiment, the actuator may be pressed against workpiece 120 (or 1200) by use of a hydraulic or pneumatic device 330, an exemplary embodiment of which is shown in FIG. 3c, that, on command, pressurizes and causes the actuator to come into contact with workpiece 120 (or 1200). The hydraulic/pneumatic pressure would then continue to increase until the actuator elastically deforms to intimately match the contours of the workpiece's outer surface. In this embodiment, the acoustic impedance of the actuator may be close to, or lower than, that of workpiece 120 (or 1200).

As noted above, introducing an impedance matching fluid between the momentum trap material and workpiece 120 (or 1200) may further enhance the coupling effects with regard to any of the above embodiments.

It should be noted that although the actuator systems shown herein involve separate actuators, it is contemplated that the systems may involve a single actuator that serves to press either or both momentum trap materials into intimate contact with the workpiece surface.

Advancers

Figure 4A:
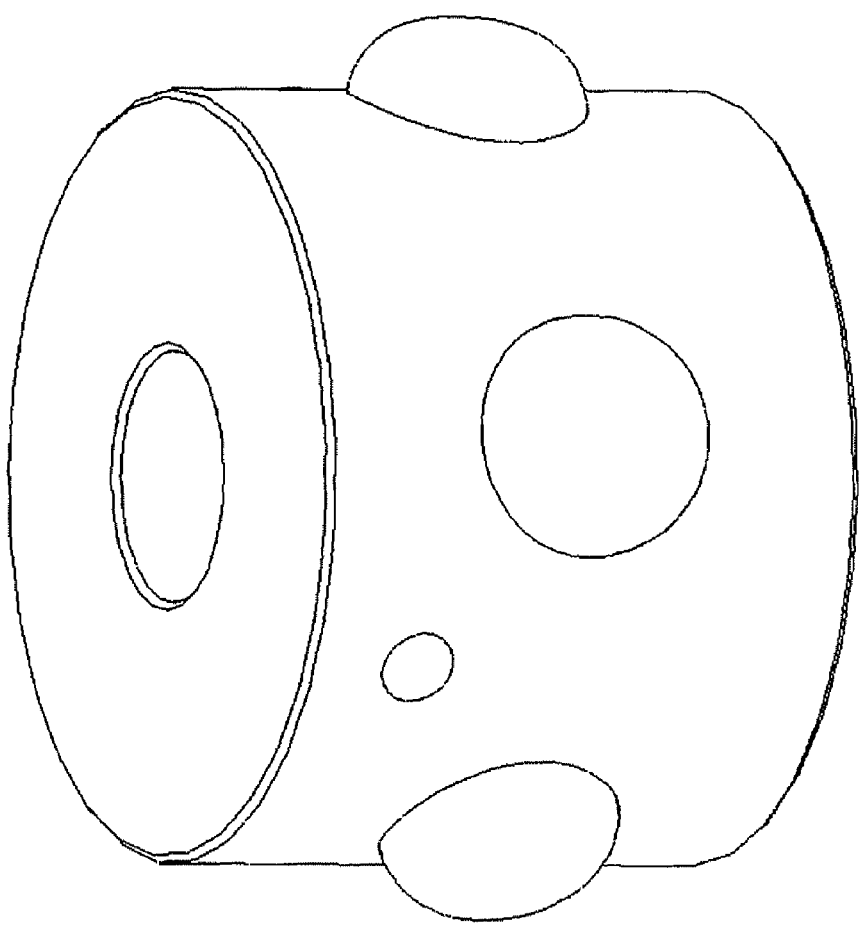
FIGS. 4a and 4b illustrate exemplary advancers in the configuration of pin roll drivers.
Figure 4B:
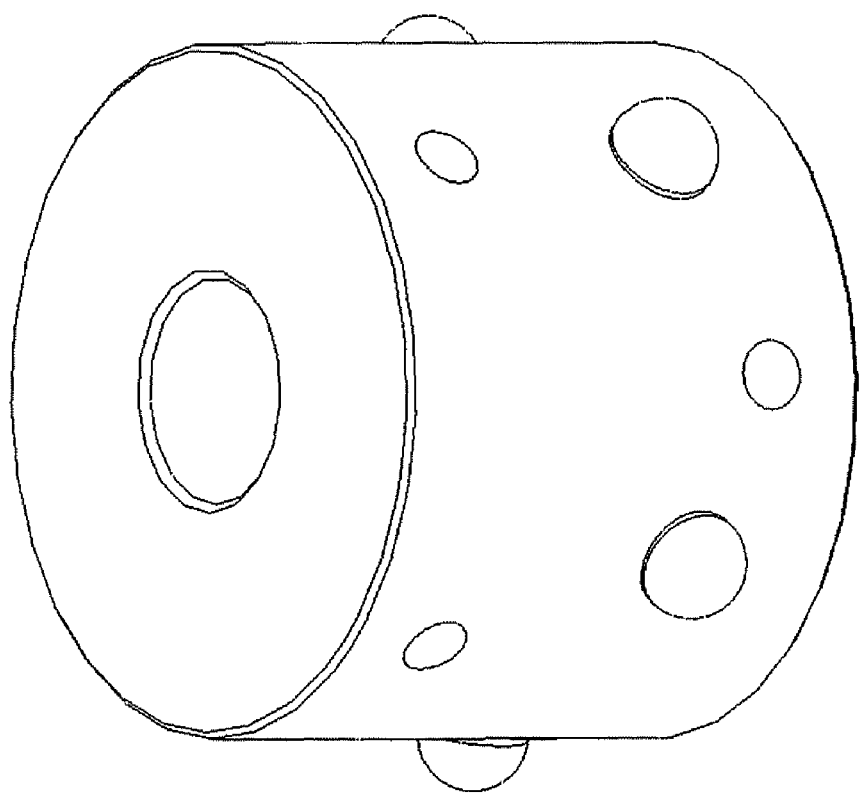

With reference again to FIG. 1b, advancer systems 400 and 400' may be capable of advancing momentum trap materials 200 and 200' along the first and second side, respectively, of metal material 120. Each momentum trap strip 200 and 200' (one for each side of the metal material 120 being processed) may be driven by a reel-to-reel drive system 400 and 400'. The unused momentum trap strips may be conveniently coiled to conserve space, Each momentum trap of momentum trap material 200, e.g., each tab 210 of momentum trap strip 200, is typically used for only one laser pulse (applied to the opposite face of the workpiece), and strip 200 may be conveniently recoiled for inspection and recycling or disposal. Stepper motors may be connected to cogs that index into holes 215 in the body 205 of strip 200 to index strip 200 into the proper positioning for processing (see, e.g., FIGS. 4a and 4b, illustrating exemplary advancers in the configuration of pin roll drivers).

In one embodiment, shown, for example, in FIGS. 1b and 1c, the system may comprise a second momentum trap material 200' (e.g., a strip 201'). Thus, a laser pulse 110 may be applied to a process tape (bridging the slots between metallic tabs 210') on one face, and a metallic tab 210 is in place directly behind the laser shock peened spot on the back face of the workpiece 120, Then the strip 200 indexes forward to present the opaque processing tape for processing on the second face, and strip 200' indexes forward to place a momentum trap tab 210' in place on the first face. This process may be repeated until processing of the workpiece is completed by alternate side processing. The metallic tabs 210 and 210' may be staggered for alternate side processing.

Figure 4C:
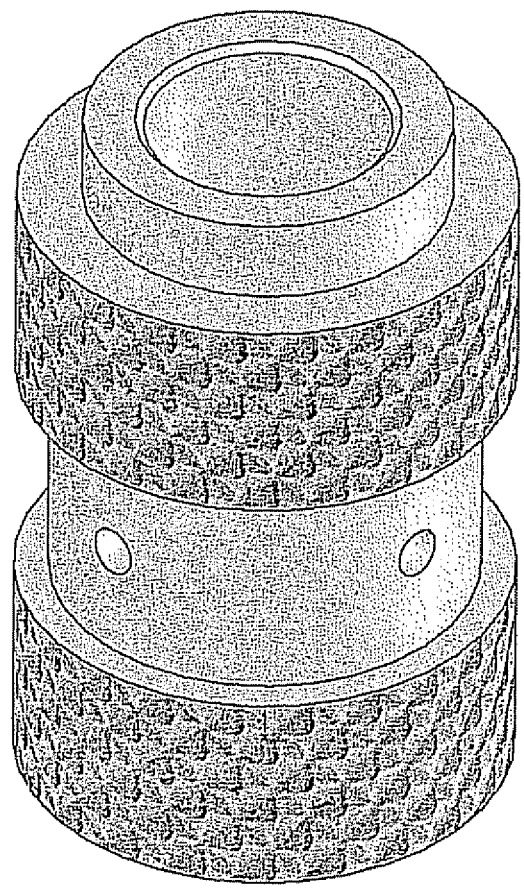
FIG. 4c illustrates an exemplary advancer in the configuration of a heavy knurl drive roller.
Figure 4D:
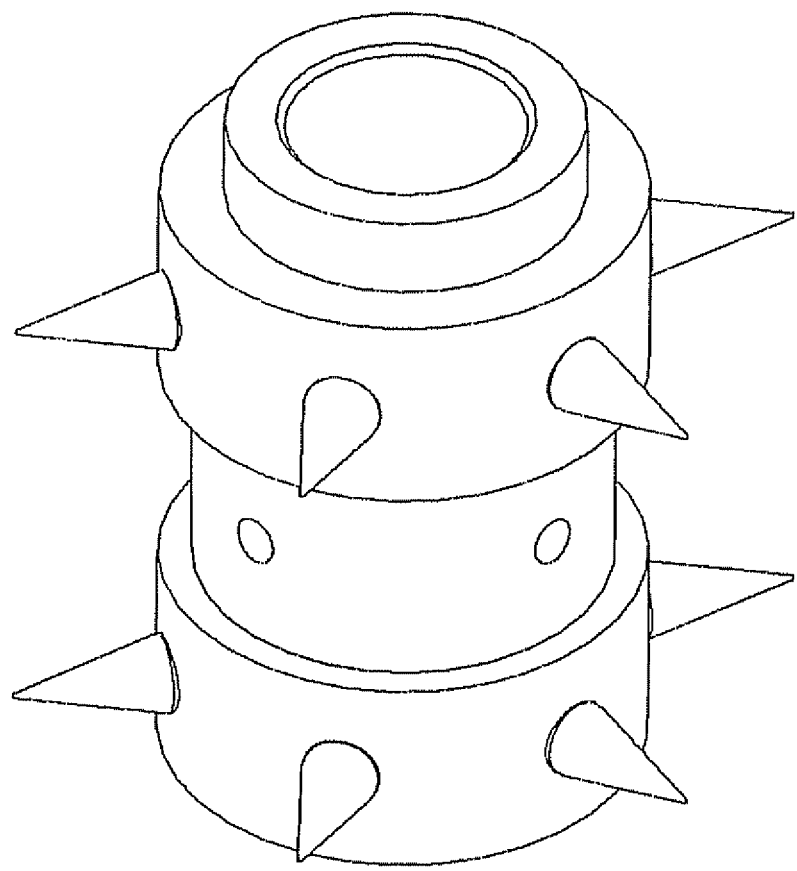
FIG. 4d illustrates an exemplary advancer in the configuration of a perforating, pin drive roller.

Similarly, with reference to FIGS. 1e and 1f, advancer systems 4000 and 4000' may be capable of advancing momentum trap materials 2000 and 2000' (e.g., a tape 2001) along the first and second side, respectively, of metal material 1200. Each momentum trap material 2000 and 2000' (one for each side of the metal material 120 being processed) may be driven by a drive system 4000 and 4000', Expanded views of two exemplary drivers are shown in FIGS. 4c and 4d. With respect to the driver shown in FIG. 4c, the knurled surface provides increased friction for the polymer tape 2000 and 2000'. With respect to the driver shown in FIG. 4d, the pins may puncture the polymer tape 2000 and 2000' to provide for a positive drive of the material. The unused momentum trap material may be conveniently coiled to conserve space. Each metal plate 2100 of momentum trap material 2000 is typically used for only one laser pulse (applied to the opposite face of the workpiece), and momentum trap material 2000 may be conveniently recoiled for inspection and recycling or disposal.

In one embodiment, shown, for example, in FIGS. 1e and 1f, the system may comprise a second momentum trap material 2000' (e.g., a polymer tape 2010'), having metallic disks 2100' (obscured) disposed upon the body 2050' of the momentum trap 2000'. The metallic disks 2100 and 2100' may be staggered for alternate side processing. Thus, a laser pulse 1100 may be applied to the polymeric body 2050' on one face of the workpiece 1200, and a momentum trap disk 2100 is in place directly behind the laser shock peened spot on the back face of the workpiece 1200. Then the tape 2000 indexes forward to present the polymeric body 2050 for processing on the back face, and tape 2000' indexes forward to place a momentum trap disk 2100' in place on the front face. This process may be repeated until processing of the workpiece is completed by alternate side processing.

Figure 5A:
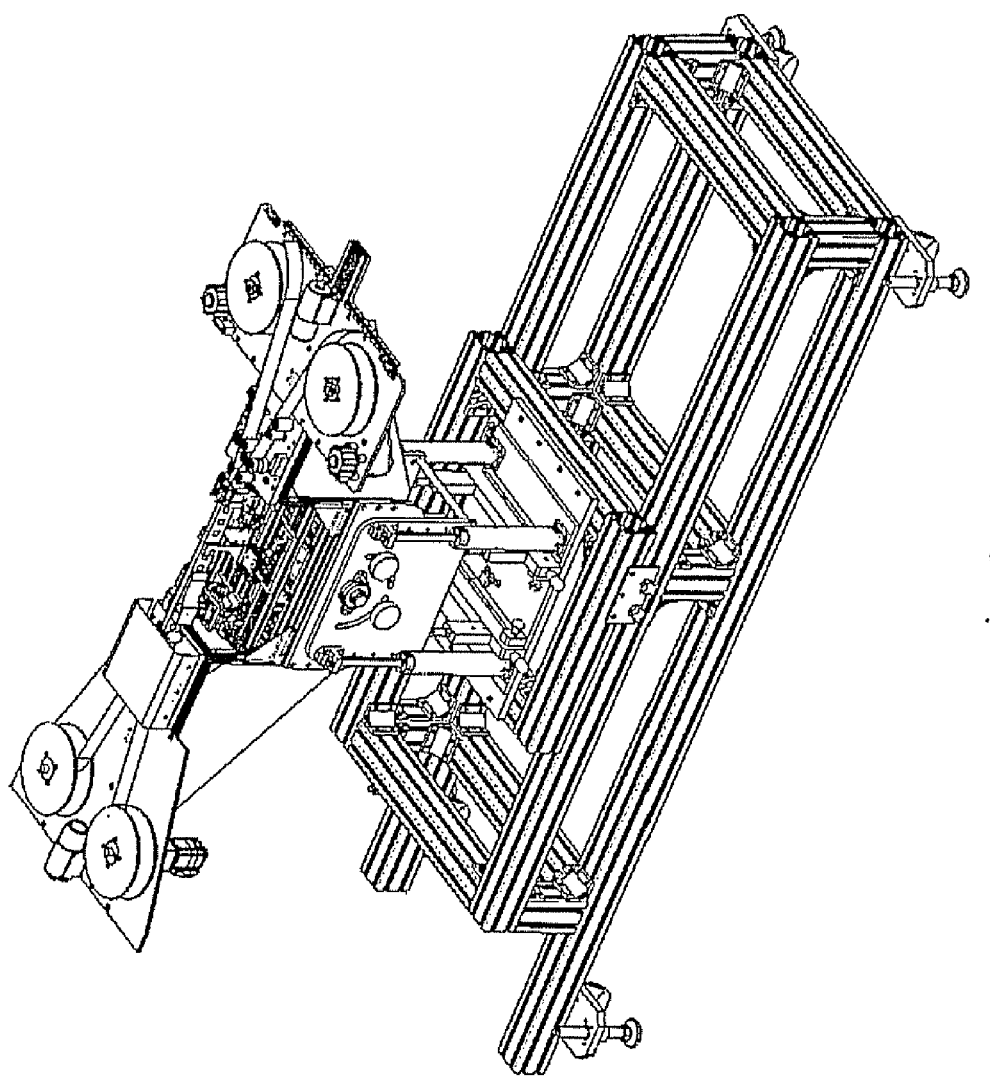
FIGS. 5a and 5b illustrate an exemplary multi-axis positioning system.
Figure 5B:
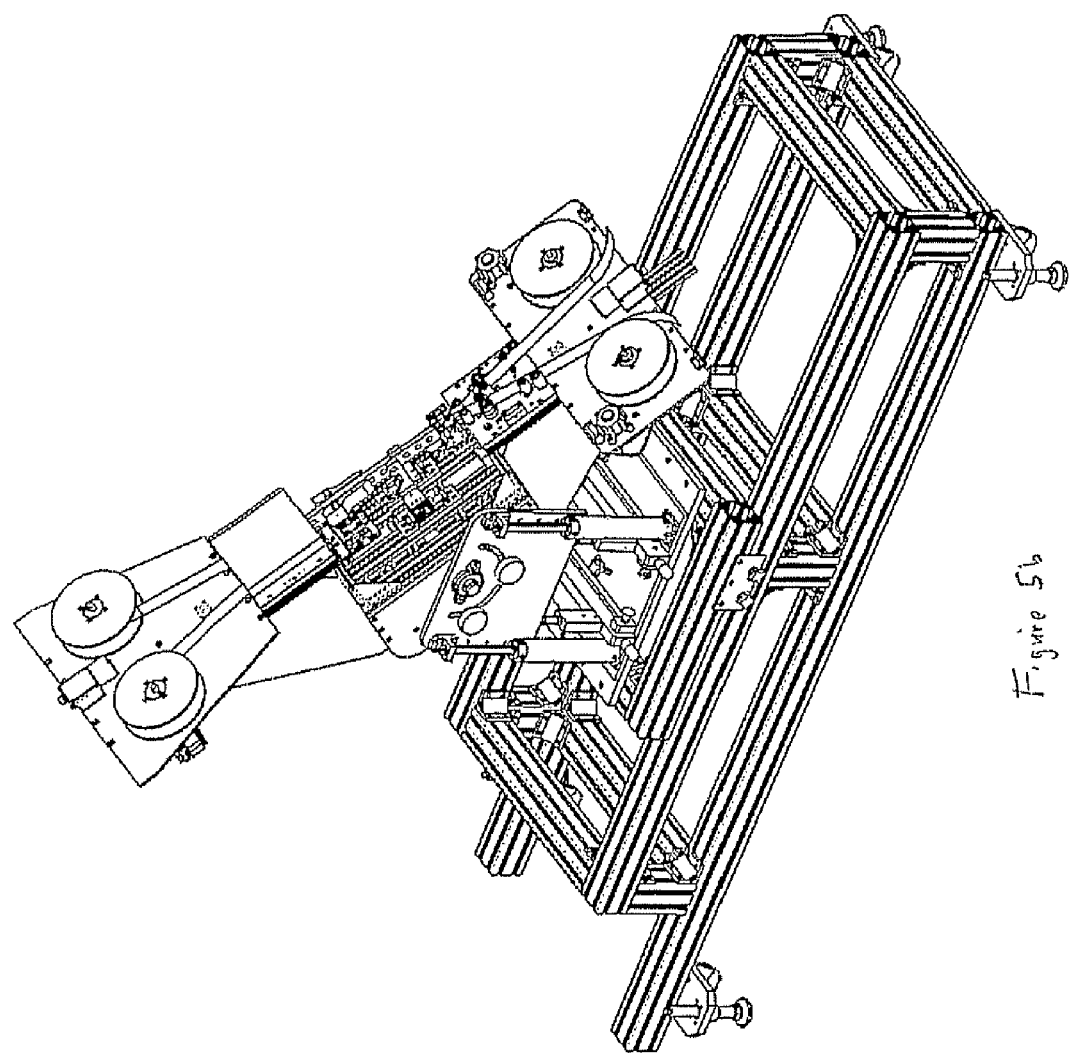

It should be noted that the momentum trap drive advancer and the actuators may be fixtured to a frame that can be rotated in multiple axes to apply the momentum trap material in various orientations, as needed. Thus, the systems described herein are not limited to horizontal movement of the momentum trap system, but may be oriented to process surfaces on the workpiece as needed. For example, such a feature is useful for processing the different orientation requirements for laser shock peening the leading edge, trailing edge, and the airfoil tips of integrally bladed rotors. An exemplary multi-axis positioning system is shown in FIGS. 5a and 5b.

It should be further noted that a single advancer may advance either or both of the first and second momentum trap materials. Moreover, it is contemplated that a part robot or other part mover, e.g., a manual operator, may serve as the advancer, such that the metal material may move relative to the momentum trap material, either in addition to the movement of the momentum trap material, or in lieu thereof.

Figure 6:
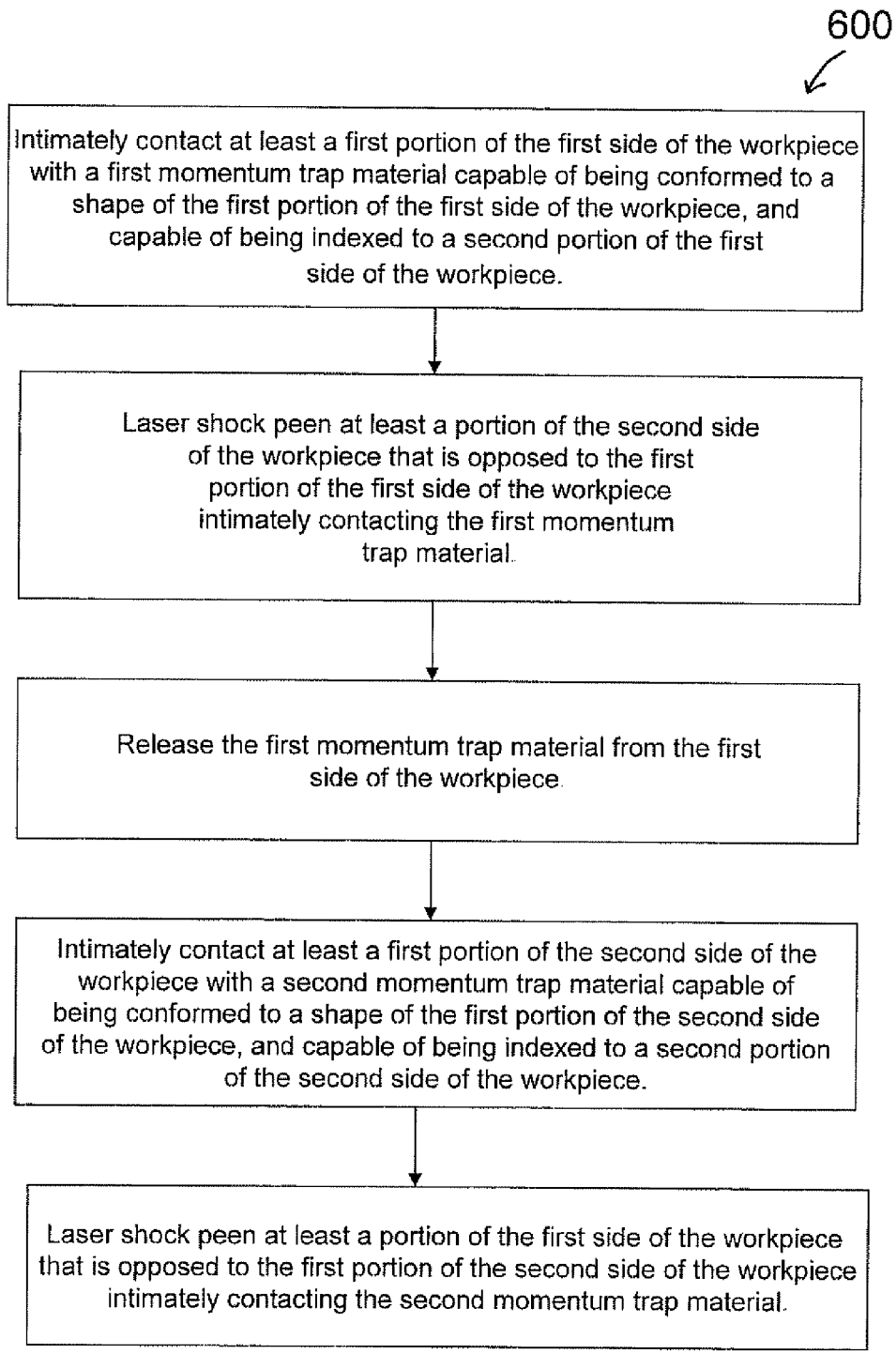
FIG. 6 is a flow chart of an exemplary method for laser shock peening a workpiece.

In one embodiment, illustrated in FIG. 6, a method is provided for laser shock peening a workpiece having a first side and a second side. For ease of understanding, and not with the intention of limiting the scope of the method in any way, the method is described in the context of the systems and apparatuses otherwise described herein, with like numerical reference to like elements. The method (600) may comprise intimately contacting at least a first portion of the first side of workpiece 120 (or 1200) with a first momentum trap material 200 (or 2000) (specifically, a tab 210 or a metallic plate 2100) capable of being conformed to a shape of the first portion of the first side of workpiece 120 (or 1200), and capable of being indexed to a second position relative to the first side of workpiece 120 (or 1200) (610), The contacting may be accomplished by, for example, engaging actuator 310 (or 3050) to press momentum trap material 200 (or 2000) into intimate contact with the first side of metal material 120 (or 1200). The method further comprises laser shock peening at least a portion of the second side of workpiece 120 (or 1200) that is opposed to the first portion of the first side of workpiece 120 (or 1200) intimately contacting the first momentum trap material 200 (or 2000) (620). The method further comprises releasing the first momentum trap material 200 (or 2000) from the first side of workpiece 120 (or 1200) (630). For example, first momentum trap material 200 (or 2000) may be released from the first side of workpiece 120 (or 1200) by retracting actuator 310 (or 3050). The method further comprises intimately contacting at least a first portion of the second side of workpiece 120 (or 1200) with a second momentum trap material 200' (or 2000') (specifically, a tab 210' or a metallic plate 2100') capable of being conformed to a shape of the first portion of the second side of workpiece 120 (or 1200), and capable of being indexed to a second position relative to the second side of workpiece 120 (or 1200) (640). The contacting may be accomplished by, for example, engaging actuator 310' (or 3050') to press momentum trap material 200' (or 2000') into intimate contact with the first side of metal material 120 (or 1200). The method further comprises laser shock peening at least a portion of the first side of the workpiece 120 (or 1200) that is opposed to the first portion of the second side of workpiece 120 (or 1200) that is intimately contacting second momentum trap material 200' (or 2000') (650).

The method may further comprise indexing first momentum trap material 200 (2000) to a second portion of the first side of workpiece 120 (or 1200), The indexing may be accomplished by, for example, engaging stepper motors that may be connected to drivers such as, for example, those embodied in FIGS. 4a-4d. The method may further comprise pressing first momentum trap material 200 (or 2000) (specifically, a second tab 210 or a second metallic plate 2100) into intimate contact with the second portion of the first side of workpiece 120 (or 1200), by, for example, engaging actuator 310 (or 3050) as described above. The method may further comprise laser shock peening at least a portion of the second side of workpiece 120 (or 1200) opposing the second portion of the first side of workpiece 120 (or 1200) intimately contacting first momentum trap material 200 (or 2000), This process may be repeated until processing of the workpiece 120 (or 1200) is completed by alternate side processing.

Unless specifically stated to the contrary, the numerical parameters set forth in the specification, including the attached claims, are approximations that may vary depending on the desired properties sought to be obtained according to the exemplary embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, apparatuses, and so on have been illustrated by describing exemplary embodiments, and while the exemplary embodiments have been described and illustrated in considerable detail, it is not the intention of the applicant to restrict, or in any way, limit the scope of the appended claims to such detail. It is, of course, not possible to describe every conceivable combination of components or methodologies for purposes of describing the systems, methods, apparatuses, and so on provided herein. Additional advantages and modifications will readily appear to those skilled in the art, Therefore, the invention, in its broader aspects, is not limited to the specific details and illustrative exemplary embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both," When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan Garner, A Dictionary of Modern Legal Usage 624 (2d. Ed. 1995).

What is claimed is:

1. A system for laser shock peening a metal material, comprising:
 a momentum trap material comprising a continuous tape;
 a laser;
 an actuator, capable of pressing the momentum trap material into intimate contact with a first side of the metal material; and an advancer, capable of advancing the momentum trap material relative to the first side of the metal material, wherein the advancer comprises a reel-to-reel drive system.

2. The system of claim 1, wherein the continuous tape is selected from a single continuous metal tape; a single continuous metal tape having at least one hole; multiple continuous metal tapes; multiple continuous metal tapes, at least one of which has at least one hole; a continuous polymer tape having at least one metal plate disposed thereon; a continuous polymer tape having at least one metal plate disposed thereon, and having at least one hole; a continuous polymer tape adhered to a metal tape; a continuous polymer tape adhered to a metal tape, at least one of the continuous polymer tape and the metal tape having at least one hole; a continuous polymer tape having discontinuous metal powder packets disposed thereon; a continuous polymer tape having discontinuous metal powder packets disposed thereon, the continuous polymer tape having at least one hole; and combinations thereof.

3. The system of claim 1, wherein the continuous tape is a metal strip having a plurality of metallic tabs extending from at least one edge of the metal strip, and wherein the metal strip has at least one hole.

4. The system of claim 1, wherein the continuous tape is polymer tape having a plurality of metallic disks disposed thereon.

5. The system of claim 1, wherein the actuator is a conformable disk.

6. The system of claim 1, wherein the actuator is selectively positionable.

7. The system of claim 1, wherein the actuator is selectively positionable via at least one of a retractable arm, hydraulic pressure, and pneumatic pressure.

8. The system of claim 1, further comprising a second momentum trap material.

9. The system of claim 8, further comprising a second actuator capable of pressing the second momentum trap material into intimate contact with a second side of the metal material.

10. The system of claim 9, further comprising a second advancer, capable of advancing the second momentum trap material along the second side of the metal material.

11. The system of claim 1, wherein the momentum trap material has an acoustic impedance that is about equal to, or greater than, an acoustic impedance of the metal material.

12. A system, comprising:
a laser shock peening device capable of generating a laser pulse;
a first and a second conformable momentum trap material, capable of being pressed into intimate contact with a first side and a second side, respectively, of a workpiece, and configured such that each of the first and second momentum trap materials is indexable,
wherein at least one of the first and second momentum trap materials comprises a continuous tape; and
an advancer, capable of indexing at least one of the first and second momentum trap material relative to the first side and the second side of the workpiece,
wherein the advancer comprises a reel-to-reel drive system.

13. The system of claim 12, wherein the continuous tape comprises a metal tape having a plurality of metallic tabs extending from at least one edge of the metal tape, and wherein the metal tape has at least one hole.

14. The system of claim 12, wherein the continuous tape comprises a polymer tape having a plurality of metallic plates disposed thereon.

15. The system of claim 12, further comprising a first actuator and a second actuator, configured to press the first and second momentum trap material, respectively, into intimate contact with the first and second side, respectively, of the workpiece.

16. The system of claim 15, further comprising a third actuator.

17. The system of claim 12, further comprising a second advancer.

18. A system for laser shock peening a workpiece, comprising:
a laser;
a continuous tape having a plurality of metallic disks disposed on a surface of the tape, the metallic disks having a sufficient acoustic impedance;
an actuator, capable of pressing at least one of the metallic disks into intimate contact with a first side of the workpiece; and
an advancer, capable of at least one of advancing the tape relative to the first side of the workpiece and advancing the first side of the workpiece relative to the tape,
wherein the advancer comprises a reel-to-reel drive system.

19. A method for laser shock peening a workpiece having a first side and a second side, comprising:
intimately contacting at least a first portion of the first side of the workpiece with a first continuous tape momentum trap material capable of being conformed to a shape of the first portion of the first side of the workpiece, and capable of being indexed to a second portion of the first side of the workpiece;
laser shock peening at least a portion of the second side of the workpiece that is opposed to the first portion of the first side of the workpiece intimately contacting the first momentum trap material;
releasing the first momentum trap material from the first side of the workpiece;
intimately contacting at least a first portion of the second side of the workpiece with a second momentum trap material capable of being conformed to a shape of the first portion of the second side of the workpiece, and capable of being indexed to a second portion of the second side of the workpiece;
laser shock peening at least a portion of the first side of the workpiece that is opposed to the first portion of the second side of the workpiece intimately contacting the second momentum trap material;
wherein at least one of the first momentum trap material and the second momentum trap material comprises a continuous tape; and
wherein at least one of the first momentum trap material and the second momentum trap material is capable of being indexed by an advancer comprising a reel-to-reel drive system.

20. The method of claim 19, further comprising indexing the first momentum trap material to the second portion of the first side of the workpiece, pressing the first momentum trap material into intimate contact with the second portion of the first side of the workpiece, and laser shock peening at least a portion of the second side of the workpiece opposing the second portion of the first side of the workpiece intimately contacting the first momentum trap material.

21. The method of claim 19, further comprising providing an impedance coupling fluid between at least one of the first and second momentum trap material, and the workpiece.

22. An apparatus for laser shock peening a metal material, comprising:

a first actuator, capable of pressing a first momentum trap material into intimate contact with a first side of the metal material, while allowing access to a laser pulse directed to at least one of the first side of the metal material and a second side of the metal material;

a second actuator, capable of pressing a second momentum trap material into intimate contact with the second side of the metal material, while allowing access to a laser pulse directed to at least one of the second side of the metal material and the first side of the metal material;

wherein at least one of the first momentum trap material and the second momentum trap material comprises a continuous tape; and at least one advancer, capable of advancing at least one of the first momentum trap material and the second momentum trap material relative to the first side of the metal material and the second side of the metal material, respectively, wherein the advancer comprises a reel-to-reel drive system.

23. The apparatus of claim 22, wherein the continuous tape is selected from a single continuous metal tape; a single continuous metal tape having at least one hole; multiple continuous metal tapes; multiple continuous metal tapes, at least one of which has at least one hole; a continuous polymer tape having at least one metal plate disposed thereon; a continuous polymer tape having at least one metal plate disposed thereon, and having at least one hole; a continuous polymer tape adhered to a metal tape; a continuous polymer tape adhered to a metal tape, at least one of the continuous polymer tape and the metal tape having at least one hole; a continuous polymer tape having discontinuous metal powder packets disposed thereon; a continuous polymer tape having discontinuous metal powder packets disposed thereon, the continuous polymer tape having at least one hole; a metal strip having a plurality of metallic tabs extending from at least one edge of the metal strip and the metal strip having at least one hole; a polymer tape having a plurality of metallic disks disposed thereon; and combinations thereof.

24. The apparatus of claim 22, further comprising a second advancer capable of advancing the second momentum trap material along the second side of the metal material.

25. The system of claim 18, further comprising a second continuous tape.

26. The system of claim 18, further comprising a second advancer.

* * * * *